United States Patent

Kashihara

[11] Patent Number: 5,982,508
[45] Date of Patent: *Nov. 9, 1999

[54] IMAGE PROCESSING METHOD AND APPARATUS

[75] Inventor: Atsushi Kashihara, Hachioji, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/649,329

[22] Filed: May 21, 1996

[30] Foreign Application Priority Data

May 23, 1995 [JP] Japan ..................................... 7-123456

[51] Int. Cl.$^6$ ............................... H04N 1/40; H04N 1/41; G06K 9/38; G06K 9/36
[52] U.S. Cl. ......................... 358/456; 358/456; 358/429; 358/457; 358/448; 358/405; 358/426; 358/462; 382/272; 382/254; 382/232; 382/237; 382/239
[58] Field of Search .................................. 358/429, 456, 358/457, 448, 405, 455, 426, 462, 463, 404, 444; 382/272, 254, 232, 237, 239; 395/106

[56] References Cited

U.S. PATENT DOCUMENTS

| 4,668,995 | 5/1987 | Chen et al. ............................... 358/462 |
| 4,847,695 | 7/1989 | Arai .......................................... 358/456 |
| 4,953,114 | 8/1990 | Sato .......................................... 358/456 |
| 5,195,175 | 3/1993 | Kanno et al. ........................... 395/106 |
| 5,282,059 | 1/1994 | Fukushima et al. ..................... 358/456 |

FOREIGN PATENT DOCUMENTS 2-081184 3/1990 Japan .

Primary Examiner—Kim Yen Vu
Assistant Examiner—Twyler Lamb
Attorney, Agent, or Firm—Fitzpatrick, Cella, Harper & Scinto

[57] ABSTRACT

In processing an image represented by binary data and an image represented by multivalue data, multivalue picture information is converted into a binary pattern corresponding to a value of the multivalue picture information, and stored in a memory. A binary pattern corresponding to multivalue picture information is detected from binary picture information stored in the memory to recover the original multivalue picture information.

32 Claims, 34 Drawing Sheets

FIG.6
MULTIVALUE DATA (8 BITS)    CODE PATTERN (600dpi, 4x4)
20H →  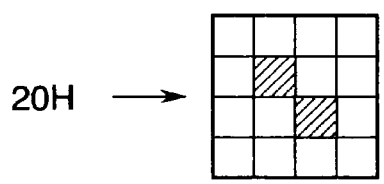     9FH → 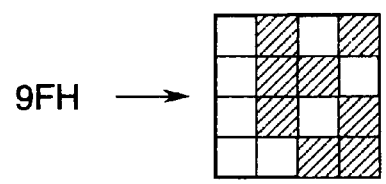
42H → 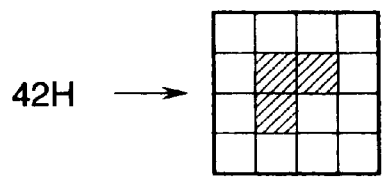    C0H → 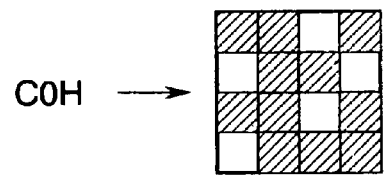
61H → 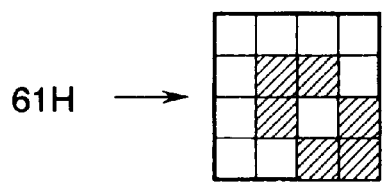    E3H → 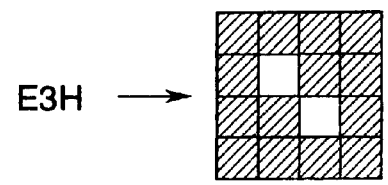
80H → 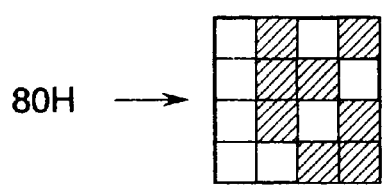
▨ : 「1」
☐ : 「0」

FIG.9

| COUNT VALUE | | 0 | 1 | 2 | 3 |
|---|---|---|---|---|---|
| SELECTOR OUTPUT | Y1 | L5 | L4 | L3 | L2 |
| | Y2 | L6 | L5 | L4 | L3 |
| | Y3 | L7 | L6 | L5 | L4 |
| | Y4 | L8 | L7 | L6 | L5 |

FIG.10

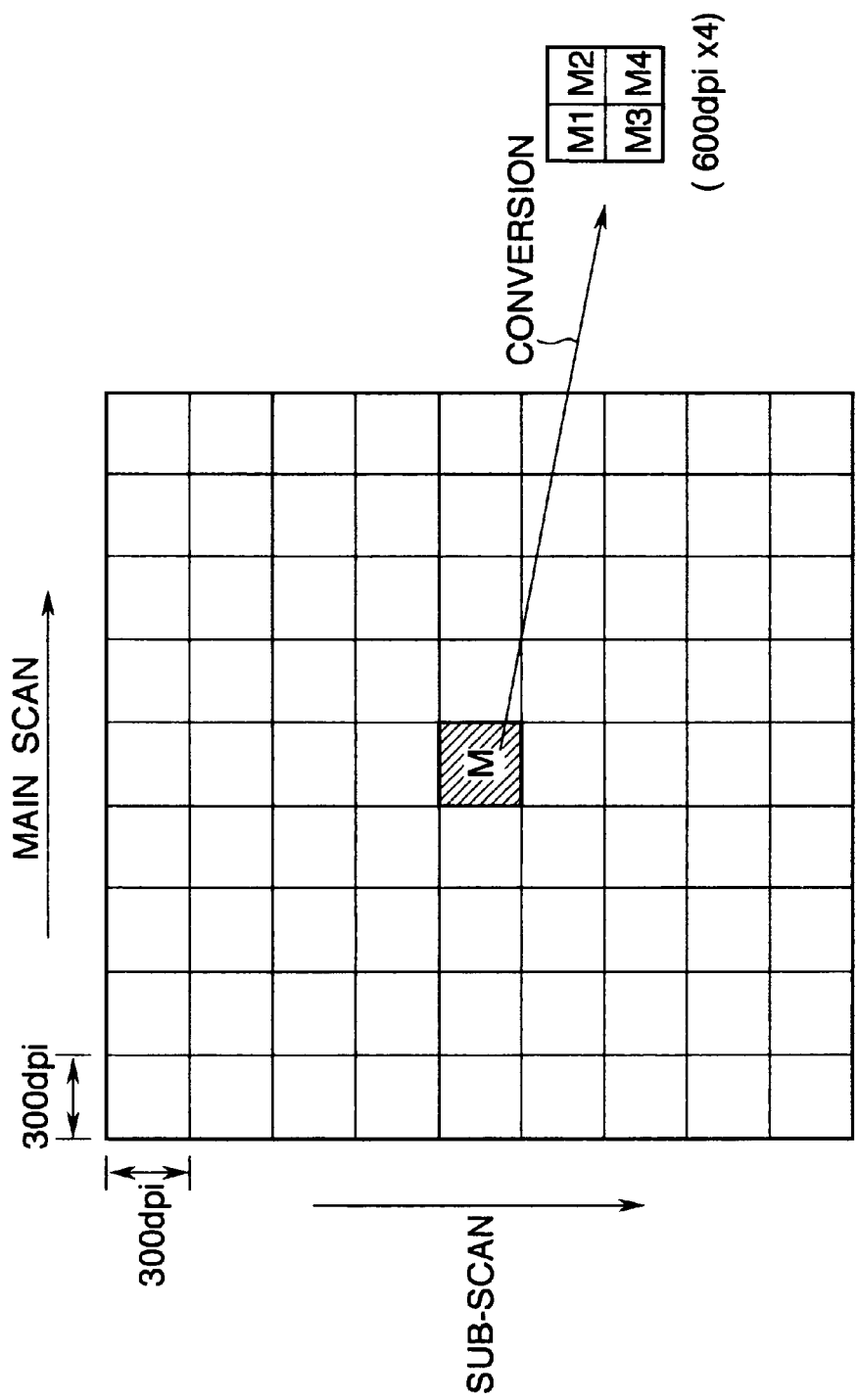

IMAGE PROCESSING METHOD AND APPARATUS

BACKGROUND OF THE INVENTION

1. Field of the Invention

The present invention relates to an image processing method and apparatus for recording, for example, half-tone images.

2. Related Background Art

As image processing apparatuses for printing an image generated by a computer on a recording medium, image processing apparatuses using electrophotography such as laser beam printers are widely used nowadays. A variety of merits of these image processing apparatuses, such as high quality print, silence, and high speed, have caused to rapidly expand the fields of desk top publishing (DTP).

It is now common to further improve the image quality by incorporating high image quality technique such as a smoothing process for smoothing the detected edges of characters and figures. Some printer engines of a print mechanism have a resolution as high as 480 dpi (dot/inch) or 600 dpi, as different from the past standard of 240 dpi or 300 dpi. A combination of such a high resolution and a smoothing process has improved the print quality much better than a conventional quality.

As a method of printing an image having gradation levels, several methods have been used conventionally, including a dither method, a density pattern method, an error diffusion method, and the like. All these methods are a so-called quasi half-tone method by which a tonal level is expressed by a ratio of black dots to white dots in a predetermined area. Since a resolution in the main scan direction can be relatively easily changed especially for laser beam printers, a pulse width modulation method has been used for expressing a gradation, for example, by changing a width of a drive pulse of a laser diode in accordance with the level of image data. As compared with the quasi half-tone method, typically a dither method, the pulse width modulation method is excellent in that both the gradation and resolution can be satisfied at high level.

However, for pulse width modulation, each pixel is required to have multivalue data. For example, if an image of 256 tonal levels with 600 dpi is to be output, each pixel has 8-bit data so that a memory capacity becomes an eightfold of a conventional binary value print. For example, for an output of an A4 size image, an image memory of about 32 MB is required, considerably raising the cost.

As a means for solving the above problem, it can be considered that a data resolution is lowered. A resolution necessary for printing an image picture having a gradation like a photograph, is 200 lines/inch ("lines/inch" is approximately equivalent to "dpi") even for reprophotography. Therefore, a resolution of 150 to 300 dpi can provide a sufficiently high image quality through electrophotography. For an expression by 8 bits per one pixel with a resolution of 300 dpi, the image memory capacity for A4 size is 8 MB and a rise of cost can be suppressed greatly, although this capacity is larger than an expression by a binary value with a resolution of 600 dpi.

With this method, however, an output image is a so-called binary value picture, i.e., vector-developed character and figure data also has a resolution of 300 dpi, lowering the print quality.

As another means for solving the above problem, it can be considered that two types of memories for a multivalue picture and a binary picture are divisionally used. For example, data of a binary picture, i.e., vector-developed character and figure, is stored in a binary, 600 dpi memory, whereas multivalue data of an image picture is stored in an 8-bit, 150 dpi memory, and these data are synthesized when the image data is transferred to a printer engine. With this method, a total memory capacity necessary for A4 size print is 4 MB for the binary, 600 dpi memory and 2 MB for the 8-bit, 150 dpi memory, totaling 6 MB.

With this method, however, since two memories are used for a binary picture and a multivalue image picture, the memory control becomes complicated and a load on a CPU increases degrading the apparatus performance. Furthermore, in order to realize this method, present software and hardware architectures are required to be changed to a large degree. Since the hardware scale increases correspondingly, the cost is raised. Still further, there arises a problem of a boundary process when data with different resolutions are synthesized.

SUMMARY OF THE INVENTION

It is an object of the present invention to provide an image processing apparatus and method solving the above problems, capable of printing a half-tone image of high quality by using a small memory capacity, without largely changing a present architecture and minimizing a cost rise.

In order to achieve the above object, an image processing apparatus of the present invention comprises: input means for inputting multivalue picture information; binary information generating means for generating binary picture information in accordance with the multivalue picture information; storing means for storing the binary picture information; and multivalue picture information generating means for generating multivalue picture information in accordance with the binary picture information stored in the storing means.

For example, the binary information generating means generates bit map information.

The image processing apparatus further comprises picture forming means for forming a picture in accordance with the multivalue picture information generated by the multivalue information generating means.

For example, the binary information generating means generates the binary picture information by converting the multivalue picture information input from the input means into a predetermined dot pattern.

For example, the binary information generating means converts the multivalue picture information input from the input means into a predetermined dot pattern corresponding to a density value of the multivalue picture information.

For example, the binary information generating means converts the multivalue picture information input from the input means into a predetermined dot pattern whose each pixel has 4×4 pixels.

For example, the multivalue information generating means includes detecting means for detecting a predetermined dot pattern from the binary picture information, and generates the multivalue picture information in accordance with the predetermined dot pattern detected by the detecting means.

For example, the multivalue information generating means includes detecting means for detecting a predetermined dot pattern from the binary picture information, and generates the multivalue picture information in accordance with the predetermined dot pattern detected by the detecting means.

For example, the picture forming means includes: light beam outputting means for outputting a light beam by modulating a light source with the multivalue picture information; and image forming means for forming an image by scanning the light beam on an image bearing medium.

For example, the light beam outputting means includes: pulse width modulating means for generating a drive signal having a pulse width corresponding to a level of the multivalue picture information; and laser driving means for driving a semiconductor laser with the drive signal from the pulse width modulating means.

For example, the image forming means is a laser beam printer for forming an image through pulse width modulation.

The image processing apparatus further comprises quasi half-tone generating means for generating a quasi half-tone pattern from the multivalue picture information input from the input means.

For example, the quasi half-tone pattern is a dither pattern.

The image processing apparatus further comprises instructing means for instructing to form a quasi half-tone pattern, and the multivalue information generating means generates the multivalue picture information from the quasi half-tone pattern generated by the quasi half-tone generating means when the instructing means instructs to generate the quasi half-tone pattern.

The image processing apparatus further comprises multivalue smoothing means for converting the binary picture information stored in the storing means into multivalue picture information after an edge smoothing process.

The image processing apparatus further comprises selecting means for selecting either a multivalue pixel of the multivalue picture information converted by the multivalue smoothing means or a pixel of the multivalue picture information generated by the multivalue information generating means.

For example, the picture forming means changes a unit of pulse width modulation in accordance with the characteristics of the multivalue picture information generated by the multivalue information generating means.

The image processing apparatus further comprises: compressing means for compressing the binary picture information generated by the binary information generating means; and expanding means for expanding the compressed binary picture information, wherein the multivalue information generating means generates the multivalue picture information by expanding the binary picture information stored in the storing means, by using the expanding means.

For example, the binary information generating means changes a resolution of the binary picture information in accordance with the amount of the multivalue picture information input from the input means.

For example, the binary information generating means changes a resolution of the binary picture information in accordance with the capacity of the storing means.

For example, when the binary information generating means generates the binary picture information with a low resolution, the multivalue information generating means converts the binary picture information with a low resolution into the multivalue picture information with a high resolution.

In order to achieve the above object, the image processing method of this invention comprises: an input step of inputting multivalue picture information; a binary information generating step of generating binary picture information in accordance with the multivalue picture information; a storing step of storing the binary picture information; and a multivalue picture information generating step of generating multivalue picture information in accordance with the binary picture information stored at the storing step.

With the above structures of the present invention, binary picture information is generated in accordance with input multivalue image picture information, and stored, and the multivalue image picture information is recovered from the stored binary picture information. Accordingly, the image processing apparatus and method capable of storing binary picture information with a small memory capacity can be provided.

Further, input multivalue image picture information can be processed without discriminating between a multivalue area and a binary area. Accordingly, the image processing apparatus and method can be provided which can form both a multivalue image picture such as a photograph and a binary picture such as characters and line figures.

BRIEF DESCRIPTION OF THE DRAWINGS

FIG. 6 is a diagram showing examples of a density code pattern of the embodiment.

FIG. 9 is a table showing the relationship between a count value and an output of the selector 12 of the embodiment.

FIG. 10 is a diagram showing pixel blocks input to a density pattern converting circuit 13 of the embodiment.

FIG. 31 is a diagram illustrating a picture data reference area and converted data of the fifth embodiment.

DETAILED DESCRIPTION OF THE PREFERRED EMBODIMENTS

Embodiments of the present invention will be described with reference to the accompanying drawings. In each of the embodiments to follow, the invention is applied to a laser beam printer having a resolution of 600 dpi by way of example.

<First Embodiment>

Figure 1:
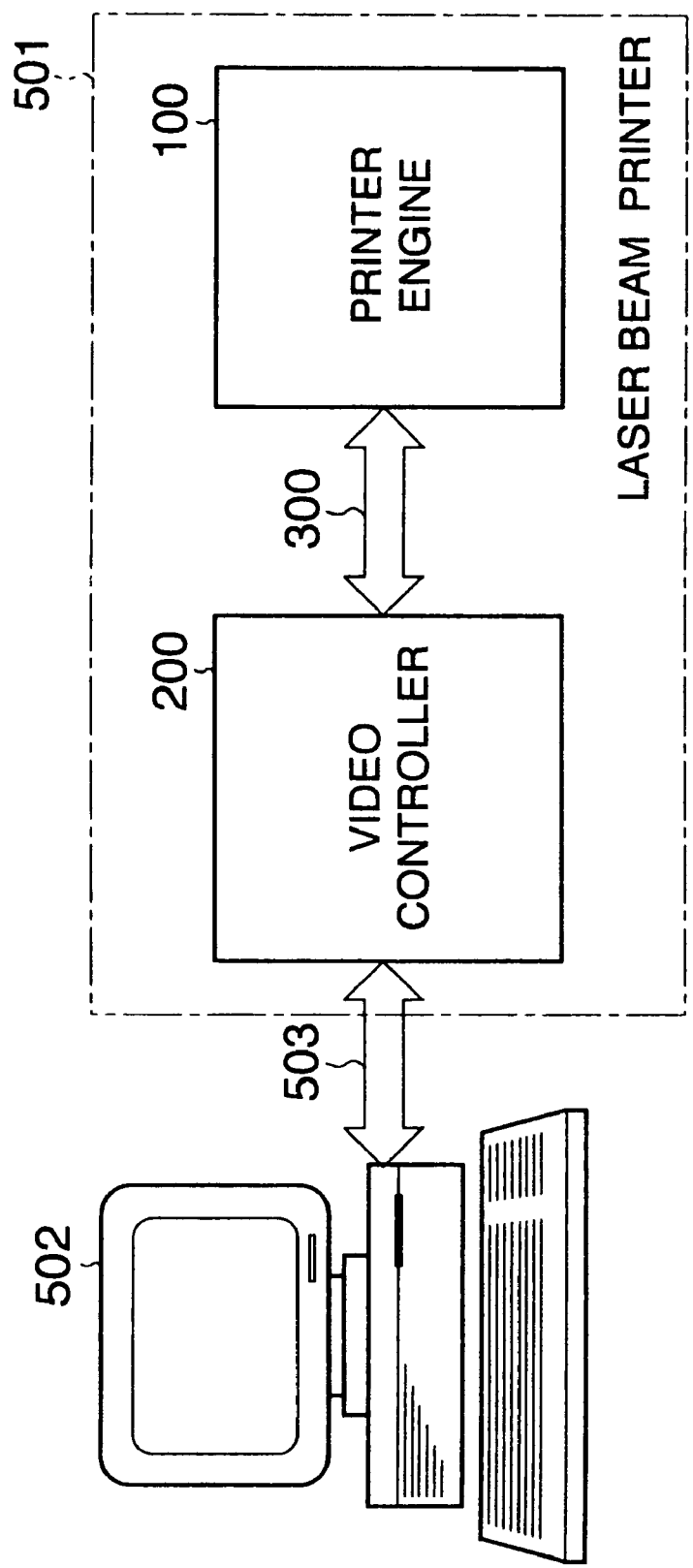
FIG. 1 shows the outline of a print system using a laser beam printer according to an embodiment of the present invention.

FIG. 1 shows the outline of a print system using an LBP according to a first embodiment of the invention.

In FIG. 1, reference numeral 502 represents a host computer which processes a document mixed with figures, pictures, characters, tables (including spread sheet calculation) and the like, by running a document processing program such as a word processor stored in a storage device such as a hard disk and a floppy disk. Processed document information is converted into print information written by a predetermined print language, in order to print it by an LBP 501 using a printer driver program (not shown). This print information contains character codes, vector information, picture information, and the like. The converted print information is sent via an interface signal line 503 to LBP 501.

LBP 501 is constituted by a video controller 200 (hereinafter simply called a "controller", where appropriate) and a printer engine 100 (hereinafter simply called a "printer" or an "engine", where appropriate). The video controller 200 receives the print information sent from the host computer 502, and in accordance with the print information, generates picture information made of dot data (bit map data). The printer engine 100 performs a series of electrophotography processes including modulating a laser beam with the picture information sequentially supplied from the video controller 200, scanning the modulated laser beam on a photosensitive drum to form a latent image, and transferring the latent image to a recording sheet, and fixing it. The printer engine 100 has a resolution of 600 dpi.

LBP 501 has at least one or more unrepresented card slots so that an optional font card or a control card (emulation card) for different print languages can be connected in addition to built-in fonts.

The video controller 200 and printer engine 100 are interconnected by interface signal lines (video interface) 300.

Figure 2:
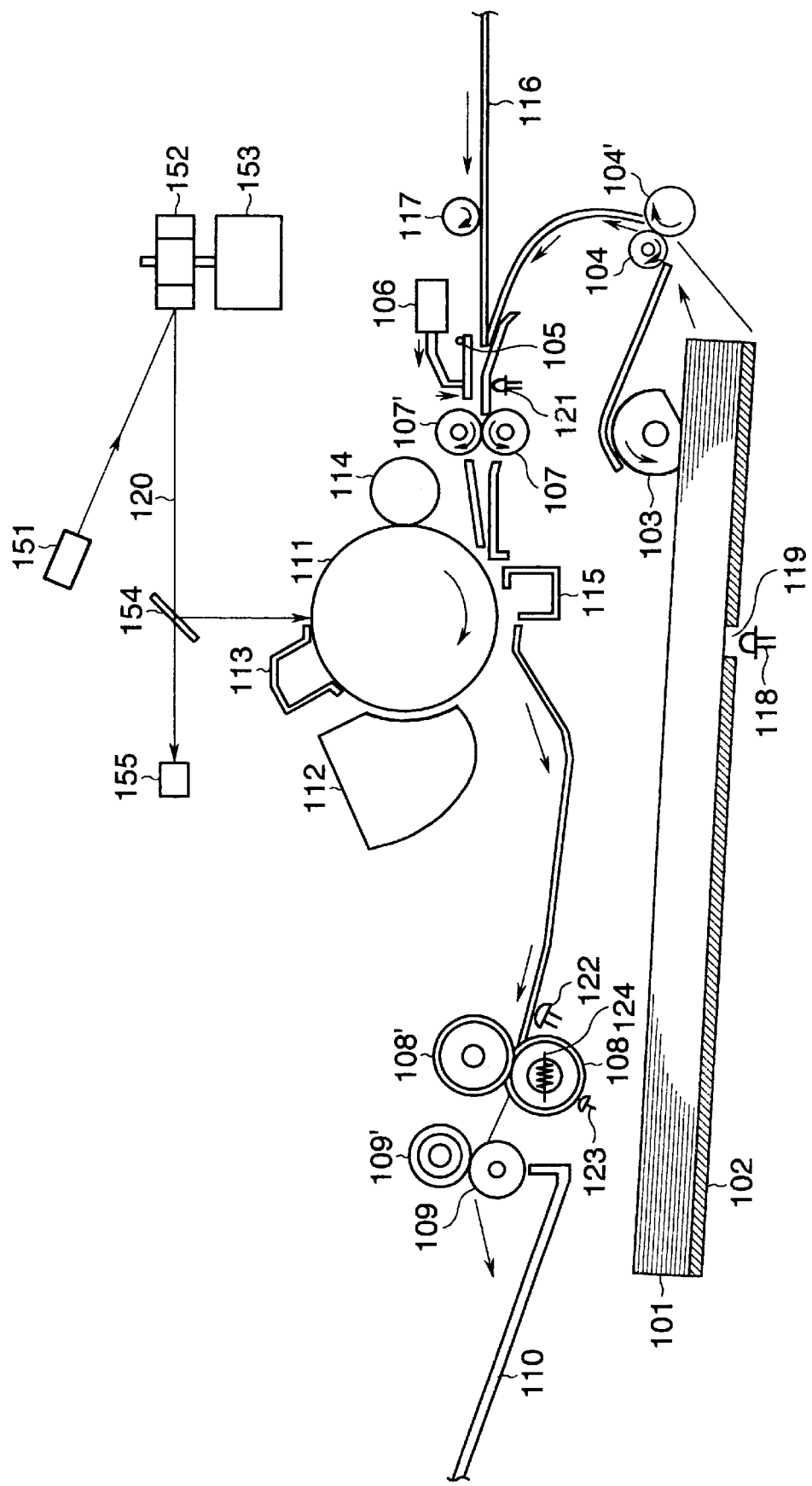
FIG. 2 is a schematic diagram illustrating the structure of a printer engine 100 of the embodiment.
Figure 3:
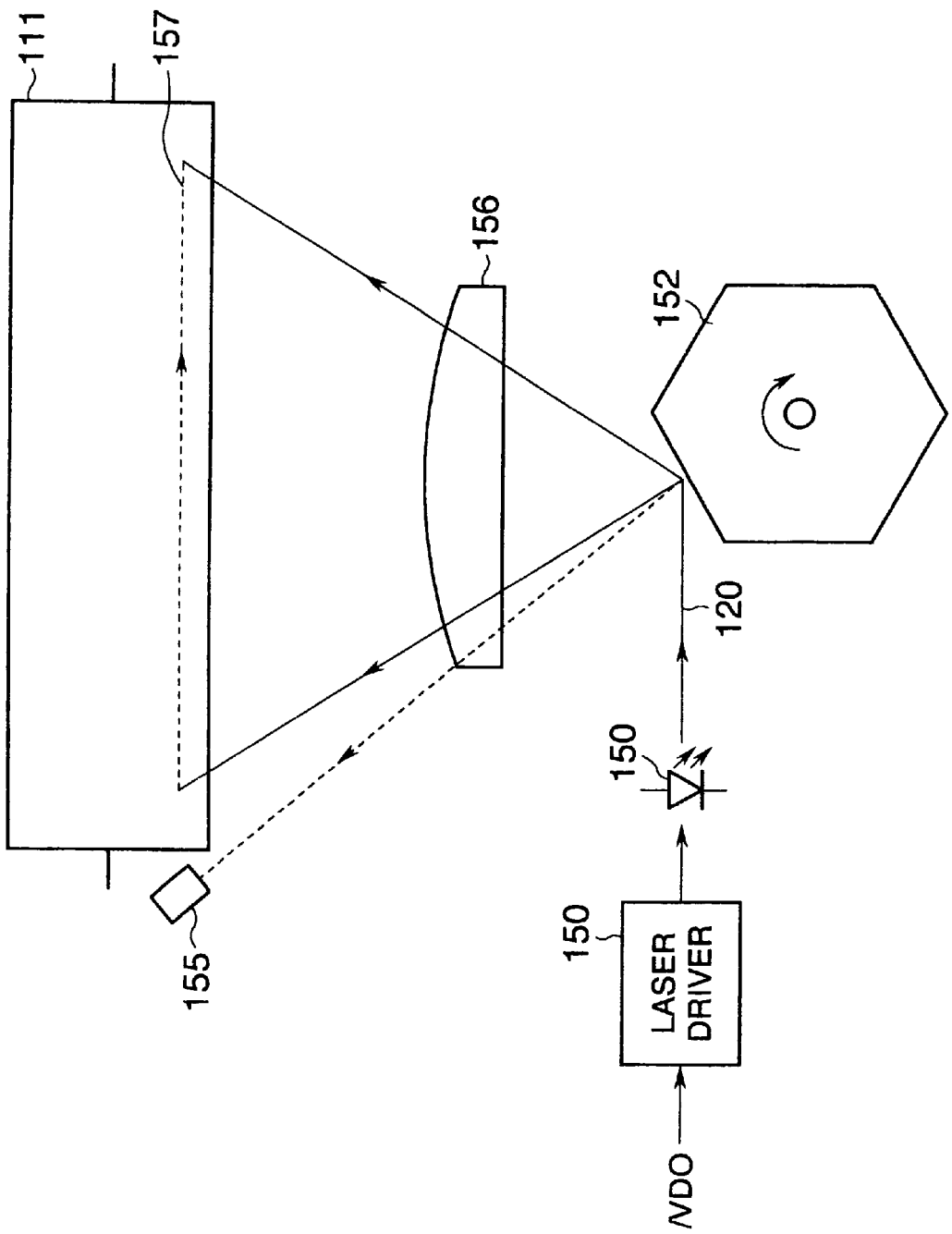
FIG. 3 is a schematic diagram illustrating an exposure controller of the printer engine 100 of the embodiment.

FIGS. 2 and 3 are diagrams showing the detailed structure of LBP 501 and the printer engine 100. In FIG. 2, reference numeral 101 represents a recording sheet used as recording medium, and reference numeral 102 represents a paper cassette for accommodating recording sheets 101. Reference numeral 103 represents a paper feeder cam for peeling off only the top sheet of recording sheets 101 placed on the paper cassette 102 and transporting the front portion of the separated recording sheet 101 to the position of paper feeder rollers 104 and 104' with an unrepresented drive means. The paper feeder cam 103 intermittently rotates each time a recording sheet is transported, one recording sheet 101 being fed by one rotation of the paper feeder cam 103.

Reference numeral 118 represents a reflection type photosensor which detects light reflected from the recording sheet 101 via a hole 119 formed in the bottom plate of the paper cassette 102 to detect an absence/presence of recording sheet.

As the recording sheet 101 is transported by the paper feeding cam 103 to the paper feeder rollers 104 and 104', they rotate and transport the recording sheet 101, while lightly holding it. As the front end of the recording sheet 101 reaches the position of a registration shutter 105, the recording sheet 101 stops and the paper feeder rollers 104 and 104' continue to rotate and generate transport torque, while slipping on the recording sheet 101. After a registration solenoid 106 is activated and the registration shutter 105 is move upward to release the registration, the recording sheet 101 is transported to transport rollers 107 and 107'. Driving the registration shutter 105 is synchronous with a delivery timing of a picture formed by a laser beam 120 and focussed on a photosensitive drum 111. Reference numeral 121 represents a photosensor which detects whether a recording sheet 101 is present at the registration shutter 105.

Next, the exposure control structure of the printer 100 of this embodiment will be described. A laser beam 120 from a semiconductor laser 151 driven in accordance with a video signal, is scanned in the main scan direction by a rotary polygon mirror 152 driven by a motor 153, and focussed via a reflection mirror 154 onto the photosensitive drum 111. Reference numeral 155 represents a beam detector for detecting the laser beam 200.

The exposure control structure will be further described with reference to FIG. 3 showing the details of the structure. In FIG. 3, reference numeral 152 represents the rotary polygon mirror 152 which is driven by the motor 153. A laser driver 150 drives the semiconductor laser 151 in accordance with a video signal supplied from the video controller 200.

The laser beam 120 from the semiconductor laser 151 driven by the laser driver 150 is scanned by the rotary polygon mirror 152 in the main scan direction, and focussed onto the photosensitive drum 111 via a focussing lens 156 disposed between the rotary polygon mirror 152 and a reflection mirror 154 and via the reflection mirror 154. During the scan in the main scan direction, the laser beam 120 forms a latent image on a main scan line 157 of the photosensitive drum 111.

Assuming that the printer 100 of this embodiment has a print density of 600 dots/inch and a print speed of 8 sheets/min (A4 or letter size), a laser turn-on time for recording one dot is about 135 ns.

The beam detector 155 placed at a main scan start position of the laser beam 120 detects the laser beam 120 and generates a /BD signal to be described later which is used as a sync signal for determining a picture write start timing in the main scan direction.

Returning back to FIG. 2, after the exposure control described above, the recording sheet 101 receives a transport torque at this time not by the paper feeder rollers 104 and 104' but by the transport rollers 107 and 107', and is transported to the photosensitive drum 111. The photosensitive drum 111 is rotated by an unrepresented gear unit and an unrepresented main motor. The surface of the photosensitive drum 111 charged by a charger 113 is exposed to the laser beam 120 and a latent image is formed therein. The electrophotography system includes a picture exposure system in which a picture is formed at the position where a light beam is exposed, and a background exposure system in which a picture is formed at the position where a light beam is not exposed. In this embodiment, the picture exposure system is used.

The latent image exposed to the laser beam 120 is visualized as a toner image by a developer 114. The toner image is transferred to the surface of the recording sheet 101 by a transfer charger 115. Reference numeral 112 represents a cleaner for cleaning the surface of the photosensitive drum 111 after the toner image was transferred to the recording sheet 101. The recording sheet 101 with the transferred toner image is fixed with fixing rollers 108 and 108', and discharged by discharge rollers 109 and 109' onto a paper tray 110.

Reference numeral 116 represents a paper feeder stand which allows a user to manually feed recording sheets one after another, in addition to feeding from the paper cassette 102. A manually fed recording sheet is lightly pushed by a manual paper feeder roller 117 on the paper feeder stand 116 and the front end of the recording sheet is transported to the registration shutter 105, like by the paper feeder rollers 104 and 104'. Thereafter, the manual paper feeder roller 117 continues to rotate while slipping on the recording sheet. The transport sequence to follow is quite the same as described with paper feeding from the paper cassette 102.

The fixing rollers 108 and 108' have a built-in fixing heater 124 which controls the surfaces of the fixing rollers 108 and 108' to have a predetermined temperature, in accordance with a temperature detected with a thermistor 123 in slip contact with the surface of the fixing roller 108, for the thermal fixation of the toner image on the recording sheet 101. Reference numeral 122 represents a photosensor which detects whether there is a recording sheet 101 at the position of the fixing rollers 108 and 108'.

Figure 4:
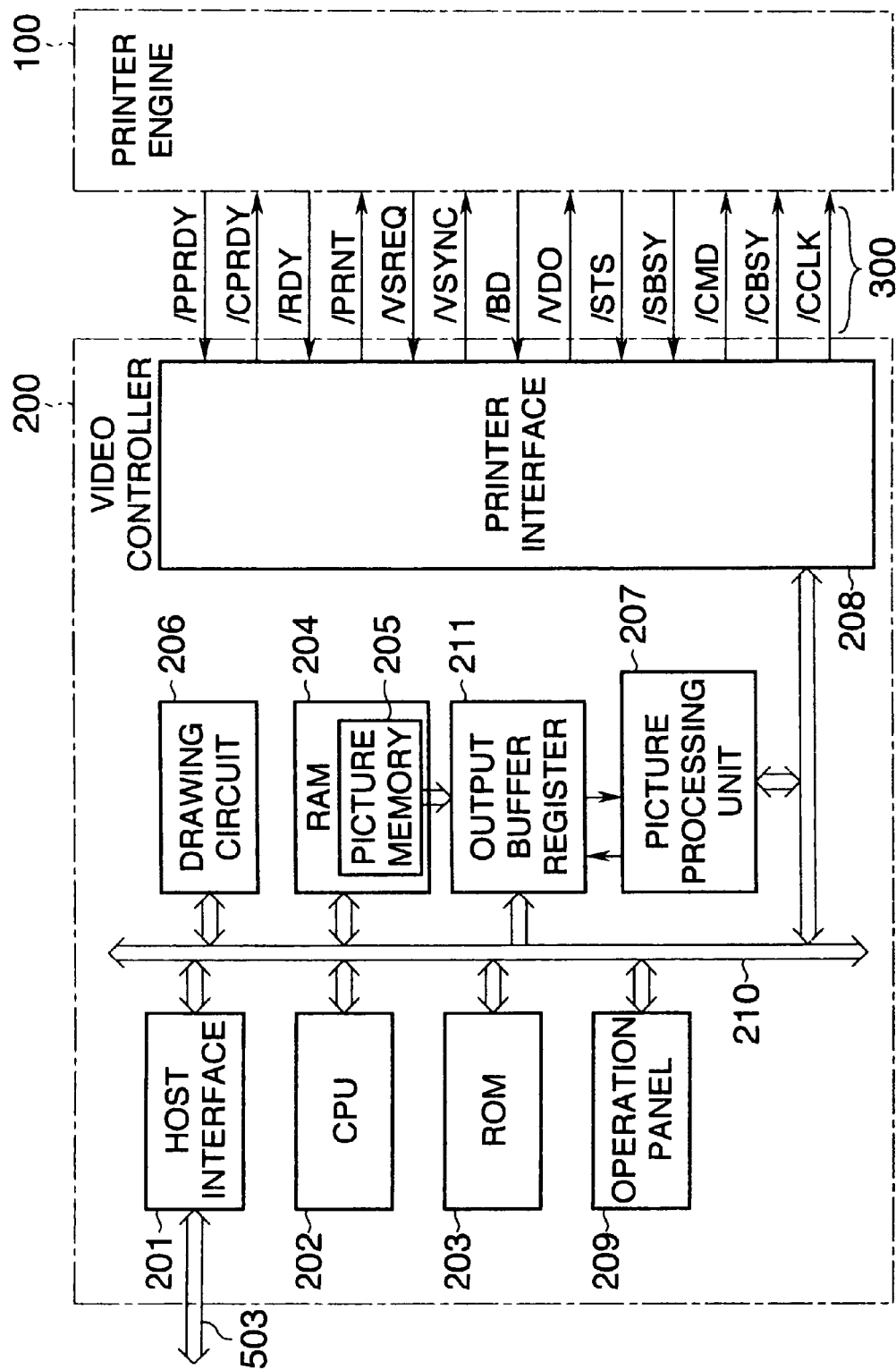
FIG. 4 is a block diagram briefly showing the structure of a video controller 200 of the embodiment.

Next, the structure of the video controller 200 will be described with reference to the detailed block diagram of FIG. 4. In FIG. 4, reference numeral 201 represents a host interface for communication with the host computer 502 shown in FIG. 1 to receive print information. Reference numeral 202 represents a CPU for controlling the whole system of the video controller 200, reference numeral 203 represents a ROM for storing control programs of CPU 202, font data, and the like, and reference numeral 204 represents a RAM used as a main memory, a working area, and the like of CPU 202. RAM 204 includes a picture memory 205 for storing bit map picture information of one page generated by a drawing circuit 206 to be described later. The capacity of RAM 204 can be increased by using an optional RAM connected to an unrepresented extension board.

Reference numeral 206 represents the drawing circuit which analyzes print information supplied from the host computer 502 and generates picture information of bit map data. Reference numeral 211 represents an output buffer register which temporarily stores picture information read from the picture memory 205 and converts the picture information into a signal for each main scan line, synchronously with the period of a picture signal supplied to the printer engine 100. Reference numeral 207 represents a picture processing unit which sequentially converts the picture information read from the picture memory 205 and supplied from the output buffer register 211, into a picture signal to be supplied to the printer engine 100, in accordance with a predetermined logic. Reference numeral 208 represents a printer interface with the printer engine 100. Reference numeral 209 represents an operation panel which a user manipulates to directly provide various settings of the printer engine 100, a test print, and other operations. Data transfer between circuit blocks of the video controller 200 is performed via a system bus 210.

The printer interface 208 of the video controller 200 and the printer engine 100 are connected by the interface signal lines 300 as described earlier. In the following, signals transferred via the interface signal lines 300 in this embodiment will be described briefly. In the following description, "/" added to a signal name indicates that the signal is active low.

A signal /PPRDY is sent from the printer 100 to the controller 200 and indicates that the printer 100 was powered and is operable.

A signal /CPRDY is sent from the controller 200 to the printer 100 and indicates that the controller 200 was powered and is operable.

A signal /RDY is sent from the printer 100 to the controller 200 and indicates that the printer 100 is ready to start printing if a signal /PRNT to be described later is received or that the printer 100 can continue a print operation. For example, this signal becomes "faulty" when the paper cassette 102 discharged all recording sheets and the print operation is impossible.

The signal /PRNT is sent from the controller 200 to the printer 100 and indicates a print operation start or continuation. Upon reception of this signal, the printer 100 starts printing.

A signal /VSREQ is sent from the printer 100 to the controller 200 and indicates that the printer 100 can receive picture data, while the signal /RDY sent from the printer 100 is "true" and after the controller 200 sends the signal /PRNT "true" to instruct a print operation start. In this state, a signal /VSYNC to be described later can be received.

The signal /VSYNC is sent from the controller 200 to the printer 100 and used for synchronizing a transfer timing of picture data relative to the sub-scan direction. With this synchronization, the toner image formed on the photosensitive drum 111 of the printer 100 can be transferred to the recording sheet 101 synchronously with the sub-scan direction.

A signal /BD is sent from the printer 100 to the controller 200 and used for synchronizing a transfer timing of picture data relative to the main scan direction. With this synchronization, the toner image formed on the photosensitive drum 111 of the printer 100 can be transferred to the recording sheet 101 synchronously with the main scan direction. This signal indicates that the scanned laser beam 120 is at the start position of the main scan.

A signal /VDO is sent from the controller 200 to the printer 100 and used for transmission of picture data to be printed. The printer 100 prints a black picture when the signal /VD0 is "true" and a white picture when "faulty".

A signal /STS is an 8-bit serial "status" signal to be sent from the printer 100 to the controller 200. This "status" signal is used for notifying various states of the printer 100 to the controller 200. For example, a wait state indicating that a temperature of the fixer (fixing heater 124) of the printer 100 does not still rise to a temperature permitting a print operation, a paper jam state, or a no paper state of the paper cassette 102. As a sync signal for transmitting this "status" signal, a signal /CCLK to be later described is used.

A signal /SBSY is used for notifying the controller 200 of that the printer 100 is transmitting the "status" signal over a signal line /STS.

A signal /CMD is an 8-bit serial "command" signal to be sent from the controller 200 to the printer 100. For example, this "command" signal is used for the controller 200 to notify the printer 100 of whether the paper feeding mode is a mode in which a recording sheet 101 is fed from the paper cassette 102 or a mode in which a recording sheet 101 is manually fed from the paper feeder stand 116.

A signal /CBSY is used for notifying the printer 100 of that the controller 200 is transmitting the "command" signal to the printer 100 over a signal line /CMD.

The signal /CCLK is a sync pulse signal output from the controller 200 and is used for synchronizing the timing when the printer 100 receives the "command" signal or when the controller 200 receives the "status" signal.

The print system of this embodiment controls the print processes in accordance with the above-described signals.

Next, a print sequence of LBP 501 described earlier will be explained.

After the printer engine 100 and video controller 200 are powered, the printer engine 100 initializes its internal circuits and supplies the signal /PPRDY "true" to the controller 200, whereas the controller 200 initializes its internal circuits and supplies the signal /CPRDY "true" to the printer 100. In this manner, both the printer 100 and controller 200 confirm a supply of power.

Thereafter, the printer 100 supplies power to the fixing heater 124 in the fixing rollers 108 and 108', and when the surface temperature of the fixing rollers 108 and 108' reaches a fixable temperature, sets the signal /RDY to "true". After the controller 200 confirms that the signal /RDY is "true" and if there is print data, it supplies the signal /PRNT "true" to the printer 100. After the printer 100 confirms that the signal /PRNT is "true", it makes the photosensitive drum 111 rotate to initialize the surface potential of the photosensitive drum 111 to a constant value. In the case of a cassette paper feed mode, the paper feeding cam 103 is driven to transport the front edges of a recording sheet 101 to the position of the registration shutters 105. In the case of a manual paper feed mode, a recording sheet manually fed from the paper feeder stand 116 is transported to the position of the registration shutter 105 by the manual paper feeder roller 117.

After the printer 100 enters the state receivable of the signal /VDO, the signal /VSREQ is set "true" and at the same time the signal /VDO is transmitted synchronously with the signal /BD. The printer 100 confirms that the signal /VSYNC is "true", and synchronously with this signal, drives the registration solenoid 106 to release the registration shutter 105 so that the recording sheet 101 is transported to the photosensitive drum 111. In response to the signal /VDO, the printer 100 turns on the laser beam 120 if a picture is to be printed black, and turns off if a picture is to be printed white, to thereby form a latent image on the photosensitive drum 111.

Next, a sequence of generating picture information by LBP 501 will be described.

In FIG. 4, print information of one page sent from the host computer 502 is input via the host computer interface 201 to the video controller 200 and to its drawing circuit 206.

Figure 5:
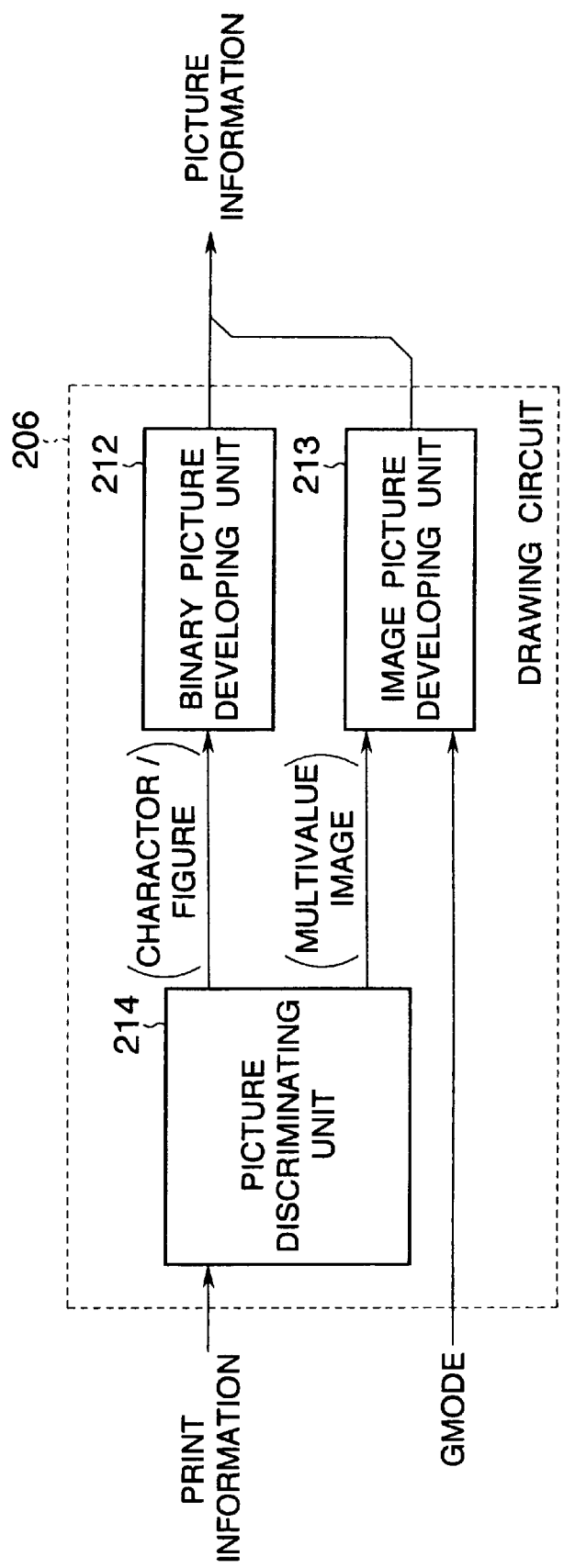
FIG. 5 is a block diagram showing the structure of a drawing circuit 206 of the embodiment.

The detailed structure of the drawing circuit 206 is shown in FIG. 5. In FIG. 5, reference numeral 212 represents a binary picture developing unit, reference numeral 213 represents an image picture developing unit, and reference numeral 214 represents a picture discriminating unit.

The picture discriminating unit 214 discriminates the input print information between binary picture information and multilevel image picture information, with a well known technique. The former includes a character print command, a figure print command, and a binary bit map data print command for an external font or the like, and the latter includes a print command for multilevel image pictures such as photograph data.

The binary picture print information is input to the binary picture developing unit 212. In accordance with the input binary picture print information, the binary picture developing unit 212 generates bit map picture information of 600 dpi by executing a developing process—developing outline font data stored in ROM 203, figure data, or binary bit map data to predetermined coordinates—and other processes. The generated 600 dpi bit map picture information is sequentially sent to and stored in the picture memory 205.

Print information discriminated by the picture discriminating unit 214 as multilevel image picture information is input to the image picture developing unit 213. The input multivalue image print information is processed assuming that it has a pixel resolution of 150 dpi and the number of tonal levels of 256 (=8-bit representation). The image picture developing unit 213 converts multivalue data of 250 dpi and 8-bit into code data using binary data of 600 dpi corresponding to an area of main scan 4 dots×sub-scan 4 dots of the binary data. A GMODE signal is input, for example, from the host computer 502, to indicate a process mode of the image screen developing unit 213. The details of the signal GMODE will be given later. In the following, a process of converting into one pixel code data by the image picture developing unit 213 will be described.

The number of tonal levels capable of being represented by multivalue image information of 150 dpi and 8-bit input to the image picture developing unit 213 is 256 from "OOH (white)" to "FFH (black)". "H" indicates a hexadecimal notation. An area of one pixel of 150 dpi on a bit map corresponds to an area of 16 bits—main scan 4 bits×sub-scan 4 bits—of pixels of 600 dpi. Therefore, a combination of data sets "1" and "0" assigned to the 16 dots in the 600 dpi area totals 2^16=65536, where A^r indicates A raised to r-th power. 254 dot patterns corresponding to multivalue data from "01H" to "FEH" are assigned code patterns representative of the tonal level of multivalue data. A code pattern of multivalue data (hereinafter called a density code pattern) is selected from patterns having a low probability of being used by binary characters and figures. It is preferable to select each density code pattern so that a ratio of "1" dots in the 16-dot area is as much as analogous to the density level of the original multivalue data. This selection attempts to prevent a large density change when a recovery of original multilevel data, to be described later, can not be made because a character/figure is overwritten on the density code pattern.

These density code patterns are held in a predetermined area of the image picture developing unit 213. One example of density code patterns is shown in FIG. 6 wherein each code pattern corresponding to each value of multivalue data of 8 bits is represented by 4×4 dots of 600 dpi. In FIG. 6, a hatched or black dot indicates "1" and a white dot indicates "0". As the value of multivalue data increases, the ratio of "1" dots in the density code pattern increases.

The density code pattern converted from multivalue data in the above manner is sequentially stored in the picture memory 205 in the form of bit map data of 600 dpi.

In this embodiment, the host computer 502 can designate a dither method as a print mode for an image picture. The dither method is widely used as a binarization method for multivalue image picture information. It is determined, from comparison of input multivalue data with threshold value matrices, whether each dot is printed or not. The threshold value matrix is of either a dot concentration type or a dot distribution type. For electrophotography, the dot concentration type is more suitable. A picture printed by the dither method becomes more coarse as compared with a pulse width modulation method to be described later. However, if a picture output from the printer 100 is copied with a copier, copy reproductivity of the dither method is superior to the pulse width modulation method.

If the dither method is designated by the host computer 502, the image picture developing unit 213 is switched to the dither process mode upon reception of the mode designation signal GMODE. In this case, the image picture developing unit 213 converts input multivalue data into binary bit map data of 600 dpi by an 8×8 dot concentration type dither method, and sequentially stores it in the picture memory 205.

When picture information of one page is prepared in the picture memory 205 in the above manner, the video controller 200 sets the signal /PRNT "true" if the signal /RDY from the printer 100 is "true", as described earlier, to instruct the printer engine 100 to start a print operation.

In the video controller 200, picture information starting from the first main scan line is sequentially read from the picture memory 205, converted in the output buffer register 211 into a picture signal (video signal) CVDO synchronizing with the picture period of the printer engine 100, and input to the picture processing unit 207.

In the following, the details of the function and operation of the picture processing unit 207 will be described. The detailed structure of the picture processing unit 207 is shown in block form in FIG. 7.

Figure 8:
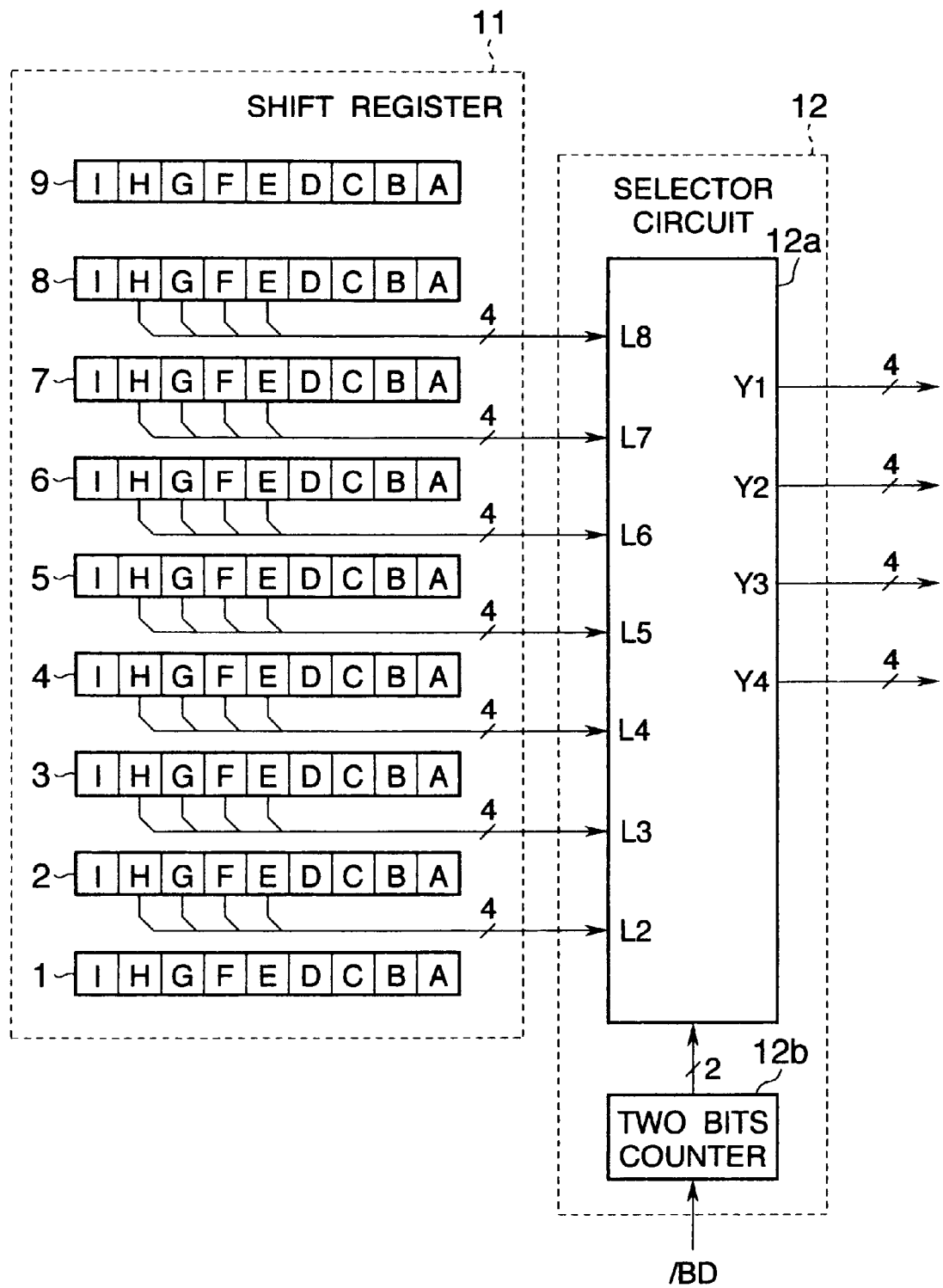
FIG. 8 is a block diagram showing the structure of a selector 12 of the embodiment.

In FIG. 8, reference numerals 1 to 7 represent line memories each having a capacity of storing the picture signal of 600 dpi of one main scan line sent from the video controller 200. Reference numeral 20 represents a memory control circuit for read/write control of the line memories 1 to 8, and reference numeral 10 represents a quartz oscillator for supplying clocks. Reference numeral 11 represents a shift register group which refers to pixel data of 9 dots×9 lines around a target pixel M, and outputs picture image data shifting in the main scan direction synchronously with a picture clock signal VCLK. Reference numeral 12 represents a selector which selects, from the data output from the shift register group 11, the data to be referred to for recovery of multivalue data from the density code pattern. Reference numeral 13 represents a density pattern converting circuit which has a function to refer to 16-bit data of main scan 4 bits×sub-scan 4 bits output from the selector 12, and if the referred 16 bits coincide with a particular density pattern, to recover a corresponding multivalue data. The density pattern converting circuit 13 also generates a picture attribute signal IMCHR to be described later.

Reference numeral 14 represents a smoothing logic circuit which refers to the data output from the shift register group 11 and converts the image data of the target pixel M into a smoothed multivalue signal. Reference numerals 15 and 16 represent latch circuits which temporarily latch the output data from the density pattern converting circuit 13 and smoothing logic circuit 14 to adjust output timings. Reference numeral 17 represents a selector which selects either multivalue image picture data converted by the density pattern converting circuit 13 or the binary picture data converted by the smoothing logic circuit 14, in response to the image area designating signal IMCHR to be described later, and outputs 8-bit multivalue picture data VDO7 to VDO0.

Reference numeral 18 represents a pulse width modulating circuit which converts the multivalue picture data VDO7 to VDO0 into a laser drive signal VDO having a pulse width corresponding to the tonal level of the picture data VDO7 to VDO0. Reference numeral 19 represents a sync clock generating circuit which generates a picture clock signal VCLK synchronous with the main scan sync signal /BD supplied from the printer engine 100, a clock signal ⅓VCLK obtained by frequency dividing the clock signal VCLK by ⅓, and a clock signal ¼VCLK obtained by frequency dividing the clock signal VCLK by ¼. The sync clock generating circuit 19 generates the clock signal VCLK by frequency dividing clocks generated by the quartz oscillator 10 by ⅛.

Next, the operation of the picture processing unit 207 constructed as above will be described.

As described earlier, the video signal CVDO of 600 dpi is sequentially supplied from the output buffer register 211 shown in FIG. 4 to the picture processing unit 207, synchronously with the picture clock signal VCLK generated by the sync clock generating circuit 19.

A CVDO signal at the first line and first dot input to the picture processing unit 207 is input to the first bit of the highest row shift register of the shift register group 11, and to the line memory 1. Next, the memory control circuit 20 increments the addresses of the line memories 1 to 8, and thereafter a CVDO signal at the second dot is input to the highest row shift register of the shift register group 11 and written in the line memory 1. In this manner, the CVDO signals of the first line are sequentially written in the line memory 1. After the completion of writing the CVDO signals of the first line, in the next main scan, prior to inputting the CVDO signal of the second line, the CVDO signal stored in the line memory 1 (at the address same as the address given at this time to the line memory 2) is read and input to the first bit of the second row shift register of the shift register group 11. The input CVDO signal of the second line is written in the line memory 1 and the highest row shift register of the shift register group 11, and the CVDO signal read from the line memory 1 is written in the line memory 2 (at the same address as the read address of the line memory 1).

As described above, reading data of one line before at a certain address and writing new data at the same address are executed during one period of the CVDO signal. In the above manner, CVDO signals input for each line are written and read while shifting from the line memory 1, line memory 2 . . . , to line memory 8. Therefore, each line memory 1 to 8 stores signals of consecutive eight lines. As the line memories 1 to 8, a static RAM, for example, may be used.

The outputs from the line memories 1 to 8 and the CVDO signal from the output buffer register 211 are supplied to the shift register group 11 in the manner described above, and the shift register group 11 outputs a picture signal of 81 pixels in total, including main scan 9 dots×sub-scan 9 dots around the print pixel (target pixel) M, while shifting them at the same time synchronously with the XVCLK signal.

In representing each pixel by a "row—column", it is assumed that of the output data of the shift register group 11, the column number in the main scan direction is assigned A, B, C, D, E, F, G, H, and I in this order starting from the oldest data, and the row number in the sub-scan direction is assigned 1, 2, 3, 4, 5, 6, 7, and 8 in this order starting from the oldest data, i.e., from the output of the line memory 8. For example, data of the print pixel (target pixel) M is at the fifth row and fifth column in the shift register group 11, and so is represented by "5E". The print pixel is therefore actually printed after a delay of 4 main scan lines from the input of the video signal CVDO to the picture processing unit 207.

In accordance with the outputs from the shift register group 11 described above, an image data processing by the density pattern converting circuit 13 and a character/figure data processing by the smoothing logic circuit 14 are executed in parallel.

First, a process of the image data such as photograph will be described. Of the picture signals output from the shift register group 11, data of 28 bits including consecutive four dots of the target pixel M and following pixels, i.e., from the columns E to H in the second to eight rows in the sub-scan direction, are input to the selector 12. The selector 12 selects data in the area of the density code pattern from the input data, and supplies the selected data to the density converting circuit 13.

The outline of the selector circuit 12 is shown in FIG. 8. Of the picture signals output from the shift register group 11, data of 28 bits including consecutive four dots from the columns E to H in the second to eight rows (L2 to L8), are input to the selector circuit 12. Of these input data, a selector 12a selects four consecutive lines (Y1 to Y4) in accordance with a count value of a 2-bit counter 12b which counts the signal /BD. Examples of four lines selected by the selector 12a are shown in FIG. 9. As shown in FIG. 9, if the count value of the 2-bit counter 12b is "0", "L5 to L8" are selected as selector outputs Y1 to Y4. Similarly, if the count value is "1", "L4 to L7" are selected, if the count value is "2", "L3 to L6" are selected, and if the count value is "3", "L2 to L5" are selected.

In the above manner, 4-bit data totaling 16 pixel data is selectively output from output terminals Y1, Y2, Y3 and Y4. Therefore, during the consecutive four-line period, the same data is input to the density pattern converting circuit 13.

In the above manner, for example, as shown in FIG. 10, data of 16 pixels of main scan 4 dots×sub-scan 4 dots including the upper left target pixel M (5E) is input to the density pattern converting circuit 13.

The density pattern converting circuit 13 compares the 16-pixel data shown in FIG. 10 with the density code pattern such as shown in FIG. 6. If the 16-pixel data coincides with any one of predetermined density code patterns, the 16-pixel data is converted into a corresponding multivalue data. Specifically, multivalue picture data stored in a binary bit map memory as the density code pattern is changed to original multivalue data. In addition to this original multivalue data, if the 16-bit pixel data coincides with any one of predetermined density code patterns, the density pattern converting circuit 13 also outputs the image area designating signal IMCHR "true". The signal IMCHR "true" indicates that the data is for the multivalue image area, and the details thereof will be later described. The density pattern converting circuit 13 is constituted, for example, by known AND-OR gates.

The signal GMODE is also supplied to the density pattern converting circuit 13. In accordance with this signal GMODE, it is possible to check whether the image picture developing unit 213 of the drawing circuit 206 has generated a halt-tone picture by the dither method. Therefore, if a half-tone image by the dither method is input, the density pattern converting circuit 13 does not perform a pattern matching process and each pixel of the dither half-tone picture is converted into an 8-bit multivalue data "00H" or "FFH" and output to the latch circuit 15.

The multivalue output data of the density pattern converting circuit 13 is sampled by the latch circuit 15 by the clock signal ¼ VCLK frequency divided by ¼ from the signal VCLK. In this manner, the output of the latch circuit 15 is changed in the 4×4 density code pattern unit into 150 dpi both in the main scan and sub-scan directions.

The multivalue output data is supplied via the selector circuit 17 to the pulse width modulating circuit 18 as 8-bit multivalue picture signals VDO7 to VDO0, together with the image area designating signal IMCHR. The pulse width modulating circuit 18 controls the pulse width of a laser drive signal to reproduce the density of a picture, in accordance with a level of the input multivalue picture signal VDO7 to VDO0.

Figure 11:
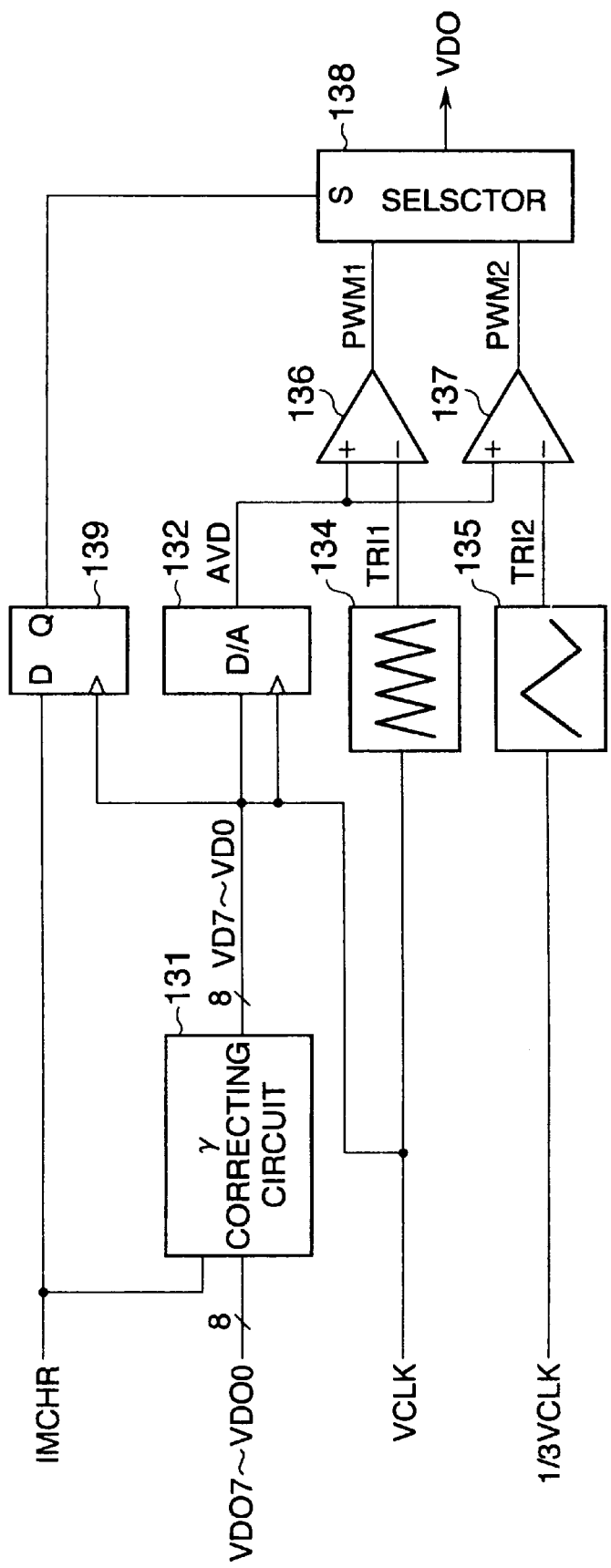
FIG. 11 is a block diagram showing the detailed structure of a pulse width modulating circuit 18 of the embodiment.

The operation of the pulse width modulating circuit 18 will be described in detail. FIG. 11 shows the details of the pulse width modulating circuit 18 in block. In FIG. 11, reference numeral 131 represents a gamma correcting circuit, reference numeral 132 represents a digital/analog (D/A) converter, reference numerals 134 and 135 represent a triangular wave generator, reference numerals 136 and 137 represent an analog comparators, reference numeral 138 represents a selector, and reference numeral 139 represents a D-type flip-flop. The operation of the pulse width modulating circuit 18 constructed as above will be described.

The signals VDO7 to VDO0 and IMCHR are input to the gamma correcting circuit 131 of the pulse width modulating circuit 18. The gamma correcting circuit 131 performs a gamma correction most suitable for the process conditions of the printer engine 100, in accordance with a line number to be subjected to a pulse width modulation and designated by the signal IMCHR. The gamma corrected 8-bit picture signal VD7 to VDO is input to the D/A converter 132 which converts the input signal into a corresponding analog voltage which is output as an analog video signal AVD. The D/A convertor 132 generates a highest analog video voltage when the value of the picture signal VD7 to VDO is "00H", and a lowest analog video signal when the value is "FFH". The analog video signal AVD is input to the non-inverting input terminals of the comparators 136 and 137.

To the inverting input terminals of the comparators 136 and 137, an output TRI1 of the triangular wave generator 134 and an output TRI2 of the triangular wave generator 135 are input. An example of the detailed structure of the triangular wave generator 134 is shown in FIG. 12.

Figure 12:
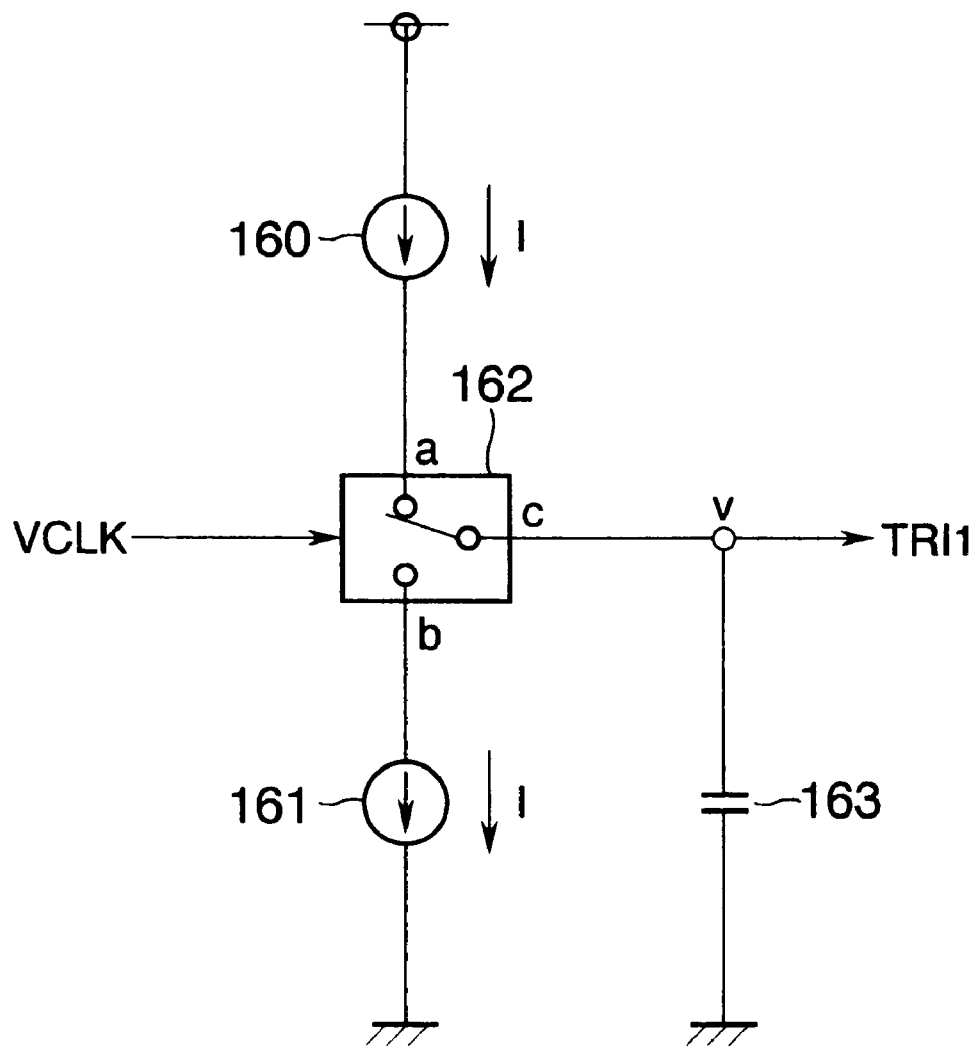
FIG. 12 is a diagram showing the detailed structure of a triangular wave generator 134 of the invention.

In FIG. 12, the picture clock signal VCLK is input to a switch 162. The one period of the picture clock signal VCLK corresponds to a laser turn-on time for printing one dot of 600 dpi. The contacts a and c are connected when the clock VCLK takes the H level and current I from a current source 160 flows through a capacitor 163 which stores charges and its voltage value V linearly increases. When the clock VCLK then takes the L level, the terminals b and c of the switch 162 are connected, the charges in the capacitor 163 are discharged, and the voltage value V linearly decreases. In the above manner, a triangular wave TRI1 having the same period as VCLK, i.e., a period corresponding to one dot print of 600 dpi, can be obtained.

The triangular wave generator 135 has the same structure as the triangular wave generator 134. However, since the clock ⅓VCLK is input, the period of an output triangular wave signal TRI2 is equal to 1/VCLK, i.e, a period corresponding to a print of three dots of 600 dpi.

Returning back to FIG. 11, the comparators 136 and 137 compare the analog video signal with the voltage levels of the triangular wave signals TRI1 and TRI2. When the voltage level of the analog video signal is higher than the voltage level of each triangular wave signal, the comparator outputs the H level signal. In this manner, pulse width modulated signals PWM1 and PWM2 are obtained.

In a general half-tone print, a unit of pixels for reproducing a density is called a line number. In the pulse width modulation process, the period (corresponding to dpi) of a triangular wave signal compared with the multivalue picture data corresponds to the line number. Therefore, the line number of the pulse width modulated signal PWM1 is 600 lines per inch, and the line number of the pulse width modulated signal PWM2 is 200 lines per inch. Depending on the characteristics of the electrophotography process, PWM1 of 600 lines per inch is excellent in its resolution but poor in gradation reproduction, whereas PWM2 of 200 lines per inch is poor in its resolution but excellent in gradation reproduction.

Next, the pulse width modulated signals PWM1 and PWM2 are input to the selector 138 which selects one of the signals PWM1 and PWM2 in accordance with the image area designating signal IMCHR. If the signal IMCHR is "true", i.e., H level, the area is for an image picture such as a photograph, and PWM2 excellent in the gradation reproduction is selected for reproducing a picture of high quality. If the signal IMCHR is "faulty", i.e., L level, the area is for a character/figure and PWM1 excellent in the resolution is selected for reproducing a picture of high quality.

The selected pulse modulated signal is output as a video signal VDO. This video signal VDO is supplied via the printer interface 208 shown in FIG. 4 to the printer engine 100 as the signal /VDO. In accordance with the signal /VDO, the printer engine 100 drives the laser to print a picture through electrophotography.

Figure 13:
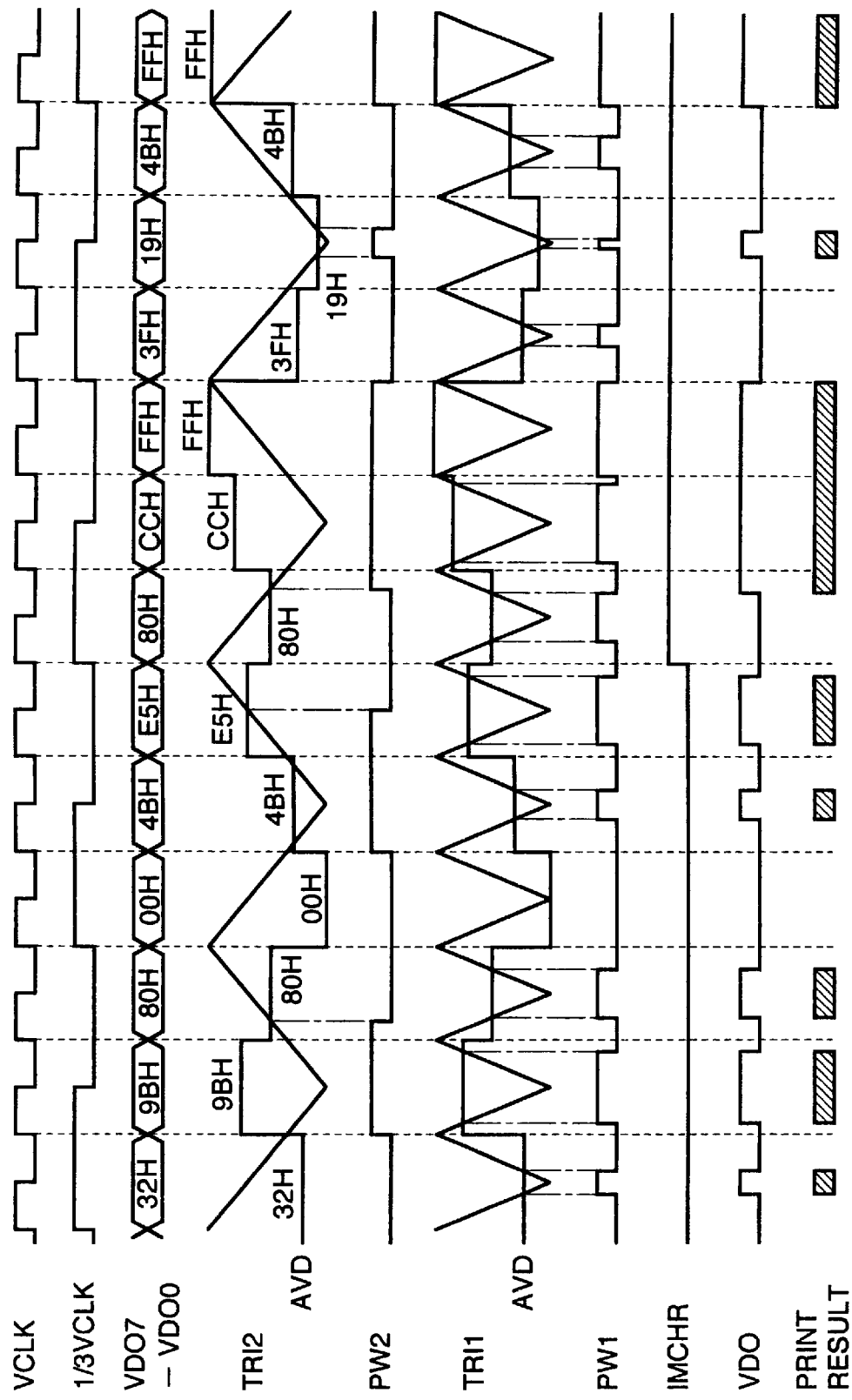
FIG. 13 is a timing chart illustrating the operation of the pulse width modulating circuit 18 of the embodiment.

The timing chart of the pulse width modulating circuit 18 described above is shown in FIG. 13. As seen from FIG. 13, in accordance with the pulse width of the signal /VDO, the density of a printed picture is reproduced.

The image data of this embodiment has thus been described. Next, the character/figure data of this embodiment will be described.

Figure 7:
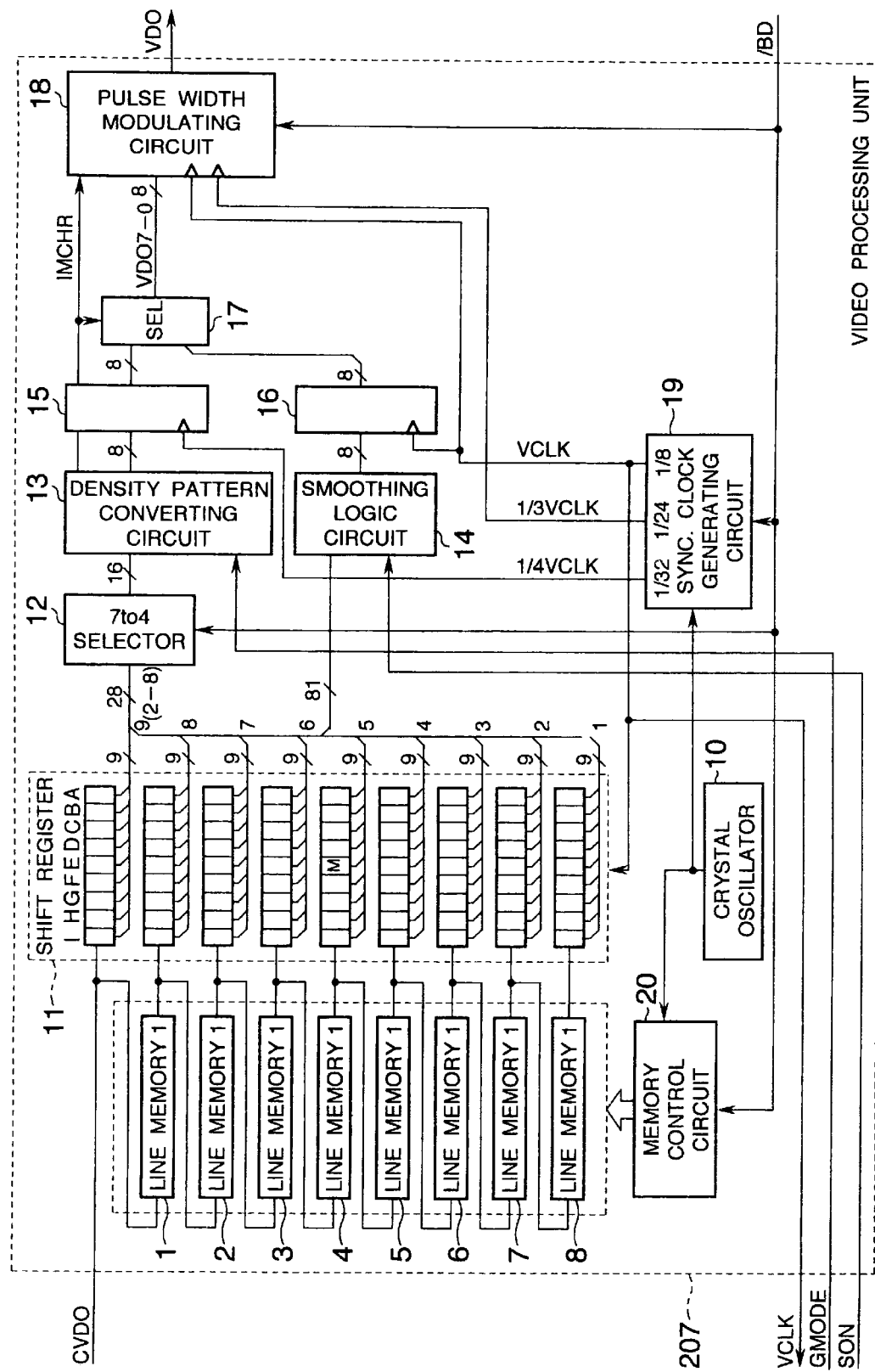
FIG. 7 is a block diagram showing the detailed structure of a picture processing unit of the embodiment.
Figure 14:
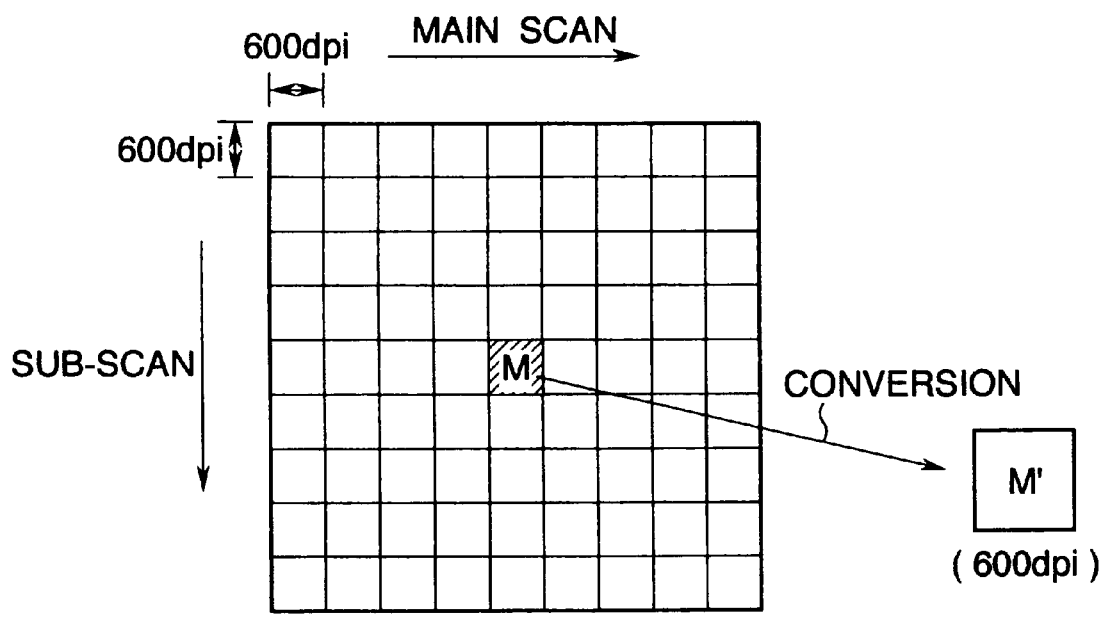
FIG. 14 is a diagram illustrating a picture data reference area.

Referring to FIG. 7, a picture signal of 81 dots of main scan 9 dots×sub-scan 9 dots output from the shift register group 11 is also input to the smoothing logic circuit 14. FIG. 14 shows pixel data of 81 dots input to the smoothing logic circuit 14. As shown, pixels adjacent to the target pixel M are referred to to detect an edge of a picture, and the picture data of the target pixel M is converted into M' to smooth the edge. For this conversion, output data of the shift register group 11 is compared with a plurality of predetermined bit map patterns for detecting characteristics of a picture, and if the output data coincides with any one of the bit map patterns, data of the target pixel M is converted into predetermined multivalue data corresponding to the bit map pattern.

A bit map pattern for detecting characteristics of a picture, is used to check whether the target pixel M and adjacent pixels form an edge and whether the target pixel M is to be converted, and is stored in the smoothing logic circuit 14 in a predetermined area thereof.

The multivalue data converted and output from the smoothing logic circuit 14 is selected by the selector 17 to be described later, if the image area designating signal IMCHR for the target pixel M is "faulty". Specifically, the smoothing process is performed only for the character/figure area.

Figure 15A:
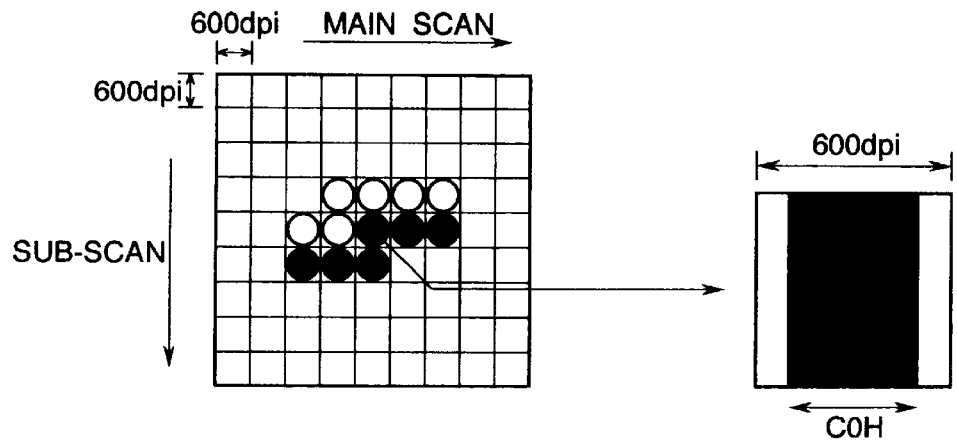
FIGS. 15A to 15C are diagrams showing examples of a bit map pattern for detecting the characteristics of binary picture data of the embodiment.
Figure 15B:
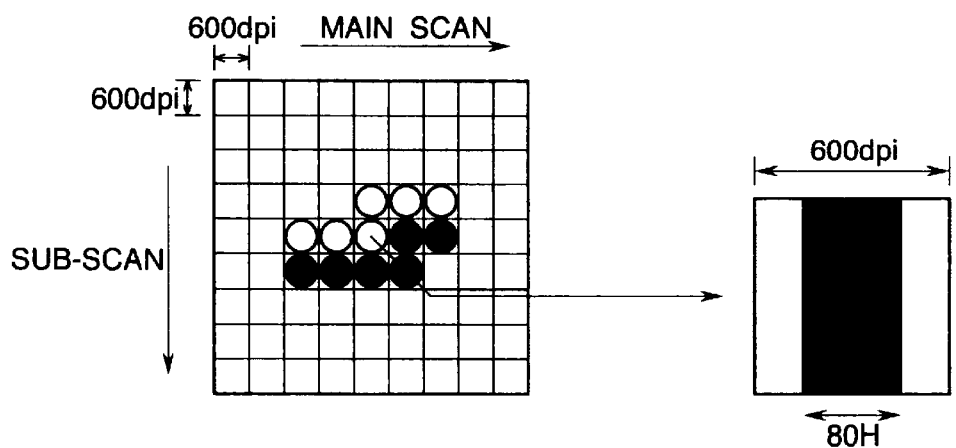
Figure 15C:
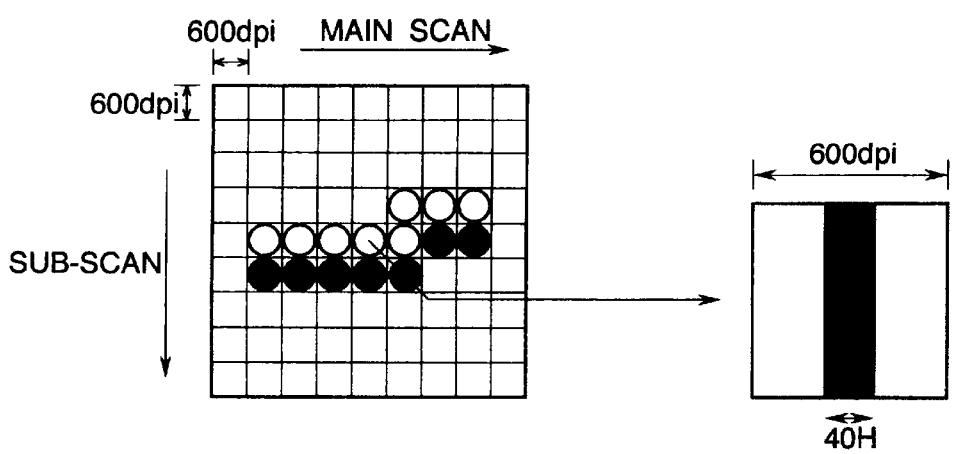

An example of the bit map pattern for detecting characteristics of a picture in the smoothing logic circuit 14 is shown in FIGS. 15A to 15C. Similar to FIG. 14, each bit map pattern shown in FIGS. 15A to 15C is formed by 9×9 dots including the target pixel M at the center of each block. In each bit map pattern, a black circle indicates a black pixel, and a white circle indicates a white dot. Other pixels may be either black or white.

For example, if a pattern coincides with the bit map pattern shown in FIG. 15A, it is assumed that the target pixel M is part of a slanted line near horizontal (in the main scan direction) and is a transition point to the high density (black) side. In this case, the original data is converted into multivalue data of "C0H". If a pattern coincides with the bit map pattern shown in FIG. 15B, it is assumed that the target pixel M is part of a slanted line near horizontal and is a transition point to the low density (white) side. In this case, the original data is converted into multivalue data of "80H". If a pattern coincides with the bit map pattern shown in FIG. 15C, it is assumed that the target pixel M is part of a slanted line near horizontal, is a transition point to the low density (white) side, and is spaced from the transition point by one pixel. In this case, the original data is converted into multivalue data of "40H".

Figure 16A:
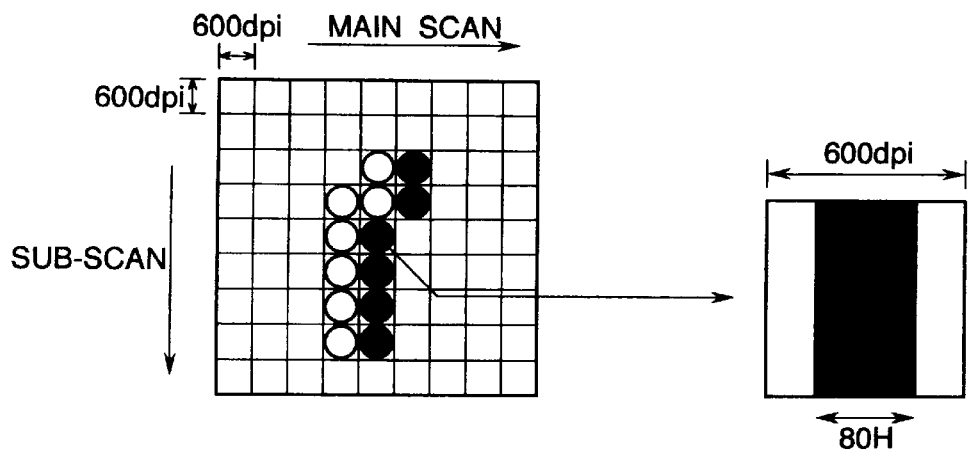
FIGS. 16A to 16C are diagrams showing examples of a bit map pattern for detecting the characteristics of binary picture data of the embodiment.
Figure 16B:
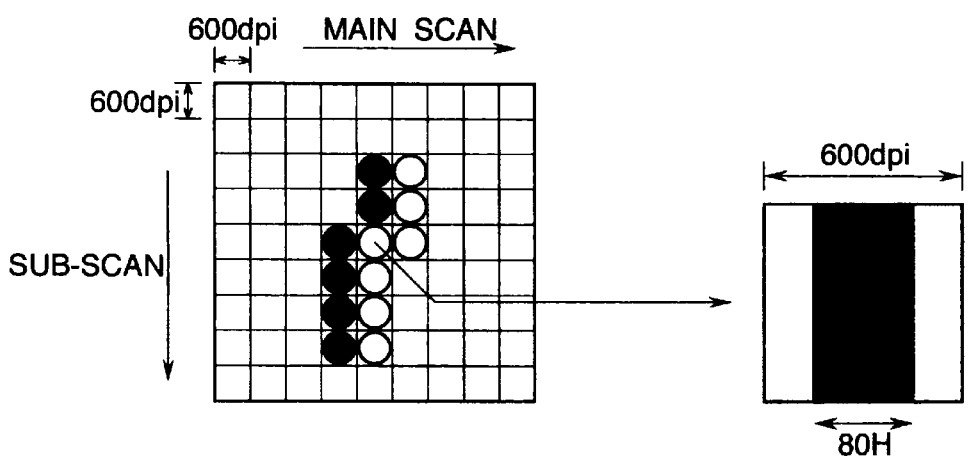
Figure 16C:
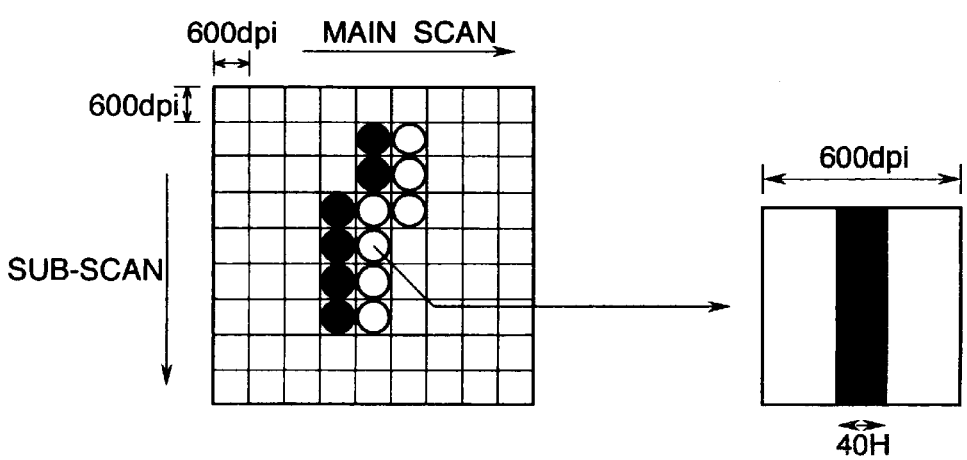

Similarly, examples of bit map patterns for detecting a slanted line near vertical (in the sub-scan direction) are shown in FIGS. 16A to 16C. The examples of bit map patterns for detecting characteristics of a picture shown in FIGS. 15A to 15C and FIGS. 16A to 16C are only illustrative, and a number of other bit map patterns for detecting lines of different slopes are also provided. Patterns symmetrical with right and left and with up and down are also provided for each bit map pattern.

If a pixel does not coincide with any one of the bit map patterns for detecting characteristics of a picture, a black pixel is converted into multivalue data of "FFH" and a white pixel is converted into multivalue data of "00H". Whether the smoothing process by the smoothing logic circuit 14 is performed or not can be designated by a signal SON. If the SON signal is "faulty", the smoothing process is not performed. Specifically, irrespective of whether the target pixel coincides or does not coincide with the characteristic detecting bit map pattern, the black target pixel is converted into multivalue data of "FFH", and the white target pixel is converted into multivalue data of "00H". Without the smoothing process, the picture processing can be speeded up. The SON signal can be set from the operation panel 209 of the video controller 200. The SON signal may be set from the host computer 502 and sent together with the picture data, to the video controller 200.

Similar to the density pattern converting circuit 13, the smoothing logic circuit 14 for detecting such characteristics can be constituted by known AND-OR gates.

Similar to the image picture, the multivalue data converted by the smoothing logic circuit 14 is supplied via the selector circuit 17 to the pulse width modulating circuit 18 as 8-bit multivalue picture signals VDO7 to VDO0, together with the image area designating signal IMCHR. The pulse width modulating circuit 18 controls the pulse width of a laser drive signal to reproduce the density of a picture, in accordance with a level of the input multivalue picture signal VDO7 to VDO0. In this case, since the area designating signal IMCHR is "faulty", the line number of pulse width modulation is 600 lines per inch.

The pulse width modulated signal is sent to the printer engine 100 as a video signal /VDO. The printer engine 100 drives the laser in accordance with the signal /VDO and prints a picture through an electrophotography process.

Figure 17A:
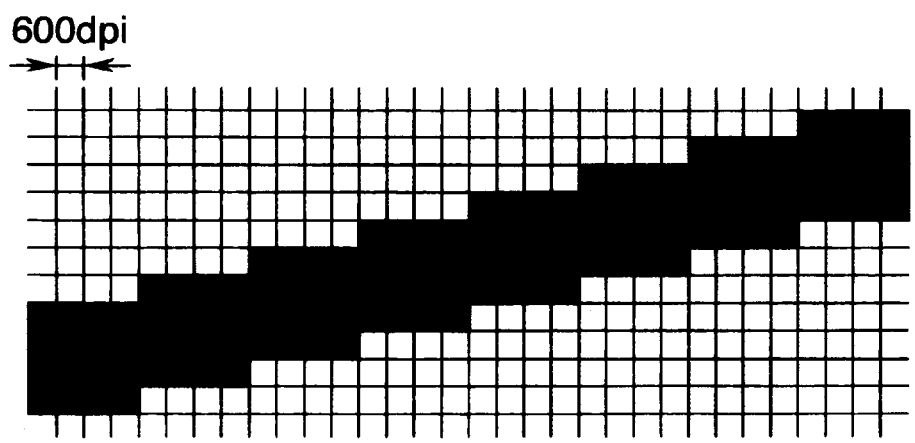
FIGS. 17A and 17B are schematic diagrams illustrating a print result of binary picture data of the embodiment.
Figure 17B:
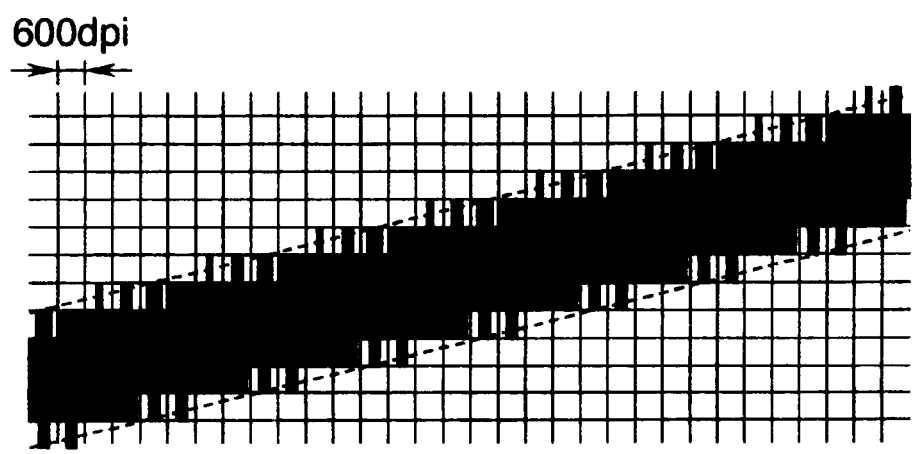
Figure 18A:
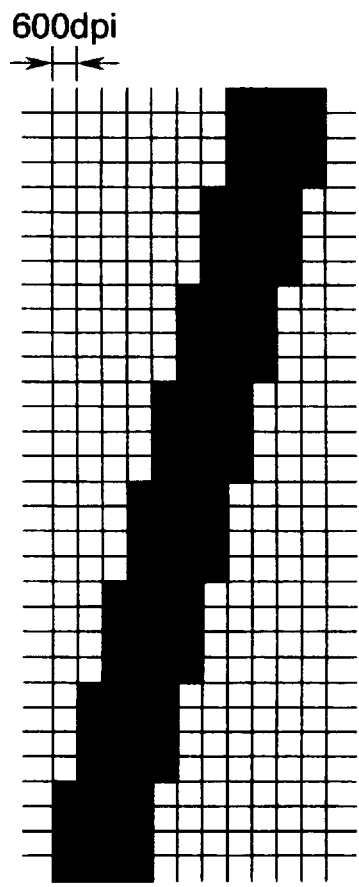
FIGS. 18A and 18B are schematic diagrams illustrating a print result of binary picture data of the embodiment.
Figure 18B:
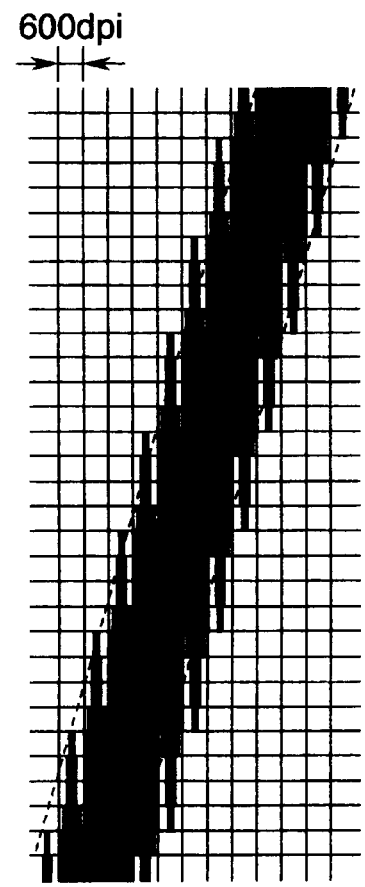

Examples of pixels printed in the above manner are shown in schematic diagrams of FIGS. 17A and 17B for slanted lines near horizontal, and of FIGS. 18A and 18B for slanted lines near vertical. FIGS. 17A and 18A show original data of 600 dpi (without smoothing), and FIGS. 17B and 18B digitally show pictures printed by multivalue data converted by the smoothing logic circuit 14. Pictures actually printed have more rounded edges than shown in FIGS. 17A and 17B and FIGS. 18A and 18B, because of the characteristics specific to the electrophotography process. Pictures particularly those shown in FIGS. 17B and 18B have dots of an intermediate density printed at transition points which dots are not formed sharply during development because of the energy distribution of the photosensitive drum, the grain size of a toner, and other reasons. Therefore, actually printed pictures are smooth as indicated by broken lines in FIGS. 17B and 18B.

By printing (expressing) pixels near edge transition points at an intermediate density, the smoothing effect can be obtained. In FIGS. 15A to 15C to FIGS. 18A and 18B, one square is a single unit of 600 dpi.

The embodiment structure is not limited to those described above. For example, the function of the density pattern converting circuit 13 may be included in the smoothing logic circuit 14. In this case, as the characteristic detecting bit map pattern of the smoothing logic circuit 14, patterns are provided in which each of the density code pattern of 4×4 dots shown in FIG. 6 constitutes the target pixel. With this arrangement, although the scale of a logic circuit for the density pattern conversion increases by about a sixteenfold, the image picture area and character/figure picture area can be processed by a single smoothing logic circuit 14, and, for example, the selector circuits 12 and 17 and latch circuits 15 and 16 are not necessary, simplifying data timing control.

As described above, according to this embodiment, in the image picture area, multivalue image data is encoded and stored in the binary value memory of 600 dpi, and for printing, the multivalue data is restored through pattern matching to print it through pulse width modulation. In the character/figure area, an edge smoothing process is performed. In this manner, a print picture of high quality can be obtained for both the image and character/figure picture areas with less memory capacity.

In the embodiment, a laser beam printer of an image exposure type in which an area exposed with a light beam is visualized, has been described. The embodiment is not limited thereto, but other printers may also be used such as a laser beam printer of a background exposure type in which an area not exposed with a light beam is visualized, an LED printer, a liquid crystal shutter type printer, and other types of electrophotography printers.

In the embodiment, a multivalue image picture is printed through pulse width modulation. The invention is also applicable to other methods such as expressing gradation by modulating a light amount of a light beam. The concept of the invention is applicable not only to an electrophotography printer but also to other image output apparatuses capable of printing a multivalue image picture.

<Second Embodiment>

The second embodiment of the invention will be described.

The second embodiment differs from the first embodiment in the smoothing process for character/figure data. In the first embodiment, a start point (start point of increasing a print width) of growing a pixel through pulse width modulation is set to the center of each pixel both for 200 lines per inch and 600 lines per inch. In the second embodiment, the start point of growing a pixel through pulse width modulation can be designated to be one of left (L), center (C), and right (R) for 600 lines per inch. One of the start points is designated when picture data of the target pixel is changed during the smoothing process.

The smoothing process of the second embodiment will be detailed. The structure of the second embodiment is the same as the first embodiment, and the description thereof is omitted.

Image data such as a photograph is processed in the same manner as the first embodiment, and so the description thereof is omitted. That is to say, a picture is printed at 200 lines per inch through pulse width modulation at the center growth.

Processing character/figure data will be described. Similar to the first embodiment, image signals of main scan 9 dots and sub-scan 9 lines including the center print pixel (target pixel) M are referred to for the pattern matching of a plurality of predetermined characteristic detecting bit map patterns in the smoothing logic circuit 14. If a pattern coincides with any one of the bit map patterns, data of the target pixel M is converted into a corresponding multivalue data. In this case, in addition to the multivalue data VFO7 to VDO0, the smoothing logic circuit 14 outputs a position information signal indicating a position in a pixel to be printed, including a LEFT (left growth), a CENTER (center growth), and a RIGHT (right growth). The multivalue data VDO7 to VDO0 and position information signals LEFT, CENTER, and RIGHT are input to the pulse width modulating circuit 18.

Figure 19A:
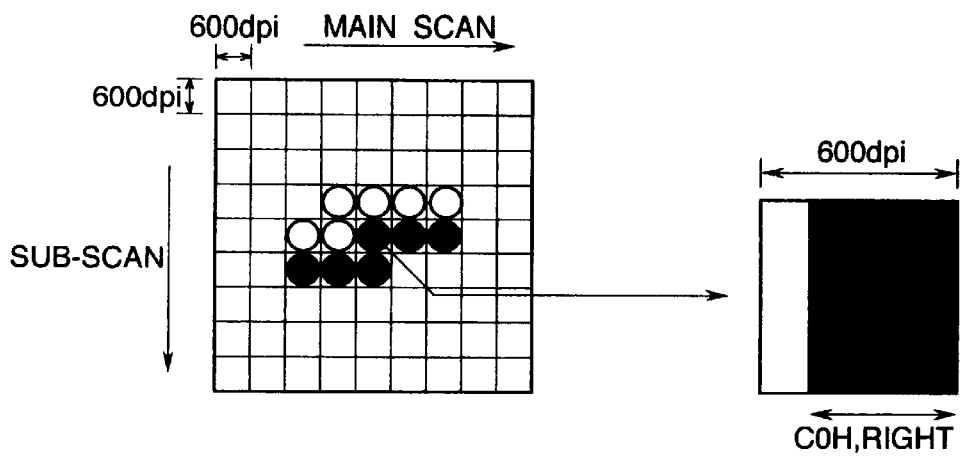
FIGS. 19A to 19C are diagrams showing examples of a bit map pattern for detecting the characteristics of binary picture data according to a second embodiment of the invention.
Figure 19B:
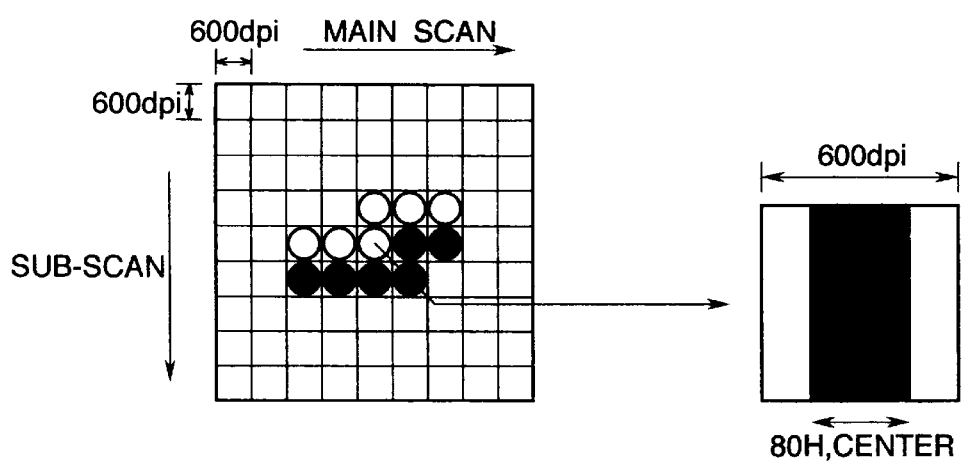
Figure 19C:
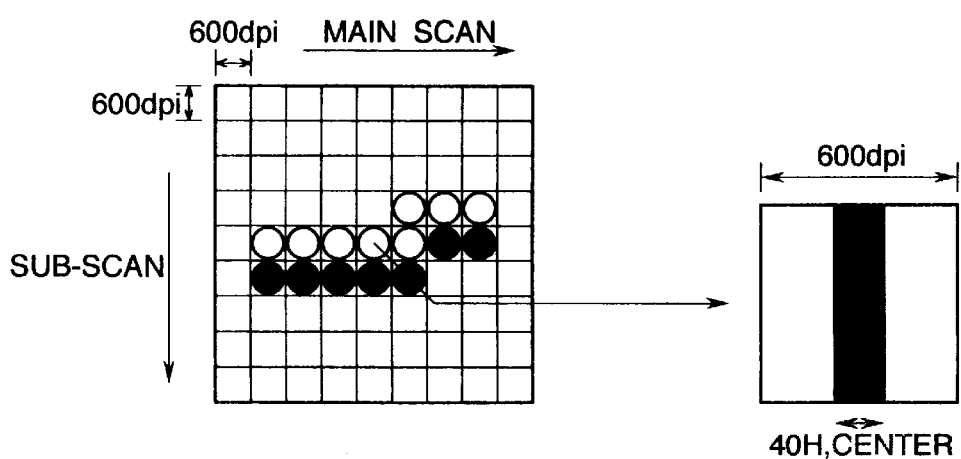
Figure 20A:
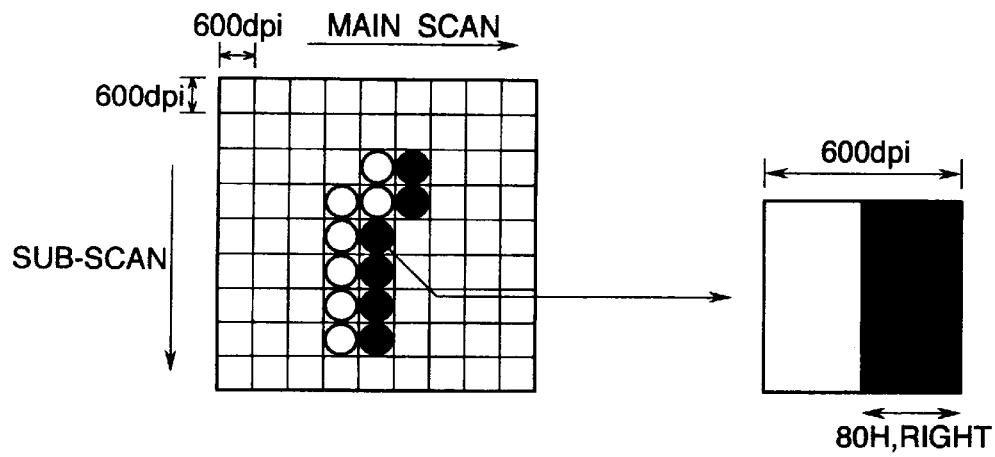
FIGS. 20A to 20C are diagrams showing examples of a bit map pattern for detecting the characteristics of binary picture data of the second embodiment.
Figure 20B:
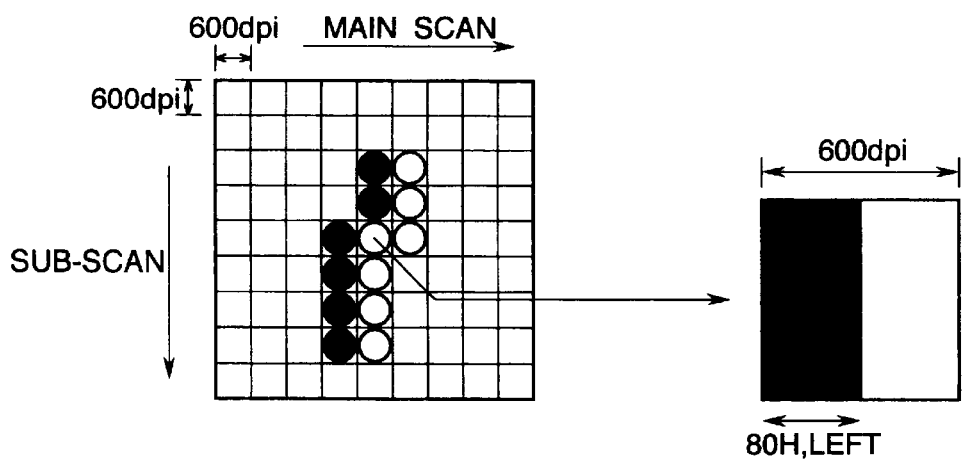
Figure 20C:
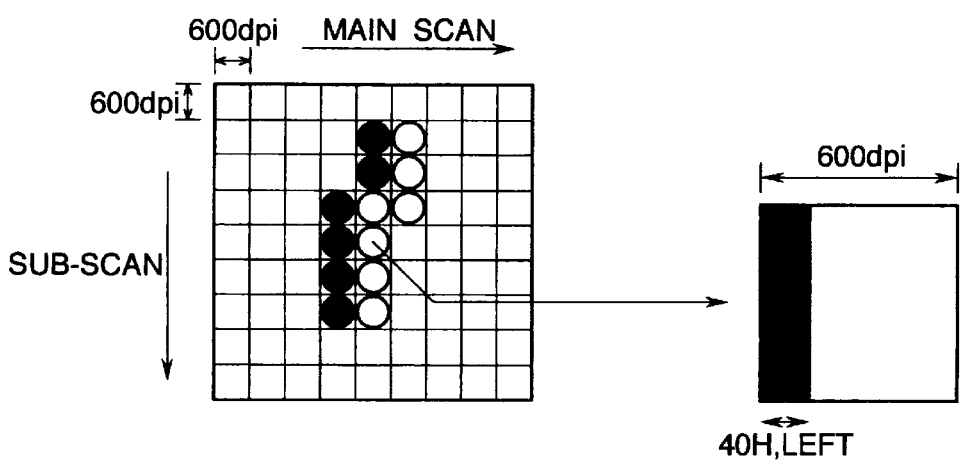

Examples of characteristic detecting bit map patterns of the second embodiment are shown in FIGS. 19A to 19C and in FIGS. 20A to 20C. The examples of characteristic detecting bit map patterns shown in FIGS. 19A to 19C and in FIGS. 20A to 20C correspond to those shown in FIGS. 15A to 15C and in FIGS. 16A to 16C of the first embodiment. For example, in FIG. 19A, the position information signal RIGHT "true" is given, and different from FIG. 15A, the value "C0H" is expressed on the right side end. Similarly, in FIG. 20A, the value is expressed on the right side end. FIGS. 19B and 19C show the examples with the position information signal CENTER "true", and FIGS. 20B and 20C show the examples with the position information signal LEFT "true".

Figure 21:
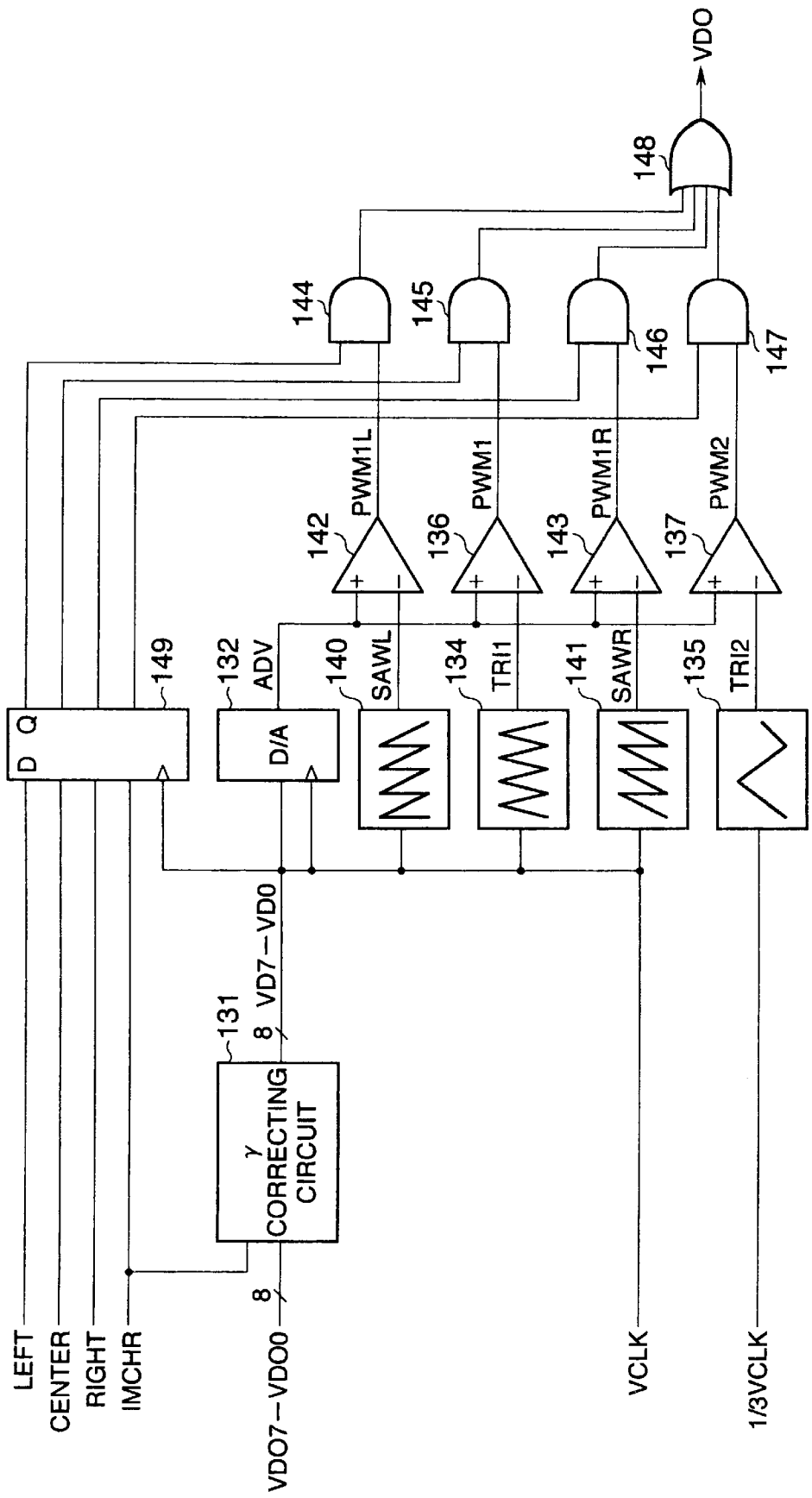
FIG. 21 is a block diagram showing the detailed structure of the pulse width modulating circuit 18 of the second embodiment.

The details of the structure of the pulse width modulating circuit 18 of the second embodiment are given in FIG. 21 in block. In FIG. 21, elements having the same function as the first embodiment shown in FIG. 11 are represented by using identical reference numerals, and the description thereof is omitted.

In FIG. 21, reference numerals 140 and 141 represent saw-tooth wave generators, reference numerals 142 and 143 represent analog comparators like the comparator 136 shown in FIG. 11, reference numerals 144 to 147 represent AND gates, reference numeral 148 represents an OR gate, and reference numeral 149 represents a 4-bit D-type flip-flop.

Similar to the first embodiment, the analog comparators 136, 137, 142, and 143 compare the analog video signal AVD obtained by analog converting the input multivalue data, with the outputs of the triangular wave generators 134 and 135 and saw-tooth wave generators 141 and 142. The comparison results are output as pulse width modulated signals PWM1, PWM2, PWM1L, and PWM1R. PWM1 is a signal for 600 lines per inch at the center growth, PWM2 is a signal for 200 lines per inch at the center growth, PWM1L is a signal for 600 lines per inch at the left growth, and PWM1R is a signal for 600 lines per inch at the right growth.

With the AND gates 144 to 147, PWM2 is made valid if the image area designating signal IMCHR is "true", PWM1L is made valid if the position information signal LEFT is "true", PWM1 is made valid if CENTER is "true", and PWM1R is made valid if RIGHT is "true". Each valid signal is output via the OR gate 148 as the VDO signal which is supplied to the printer engine 100.

Figure 22A:
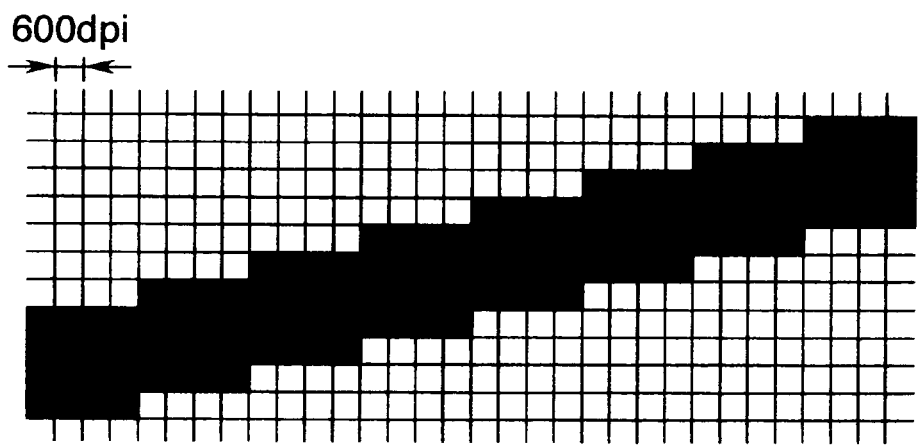
FIGS. 22A and 22B are schematic diagrams illustrating a print result of binary picture data of the second embodiment.
Figure 22B:
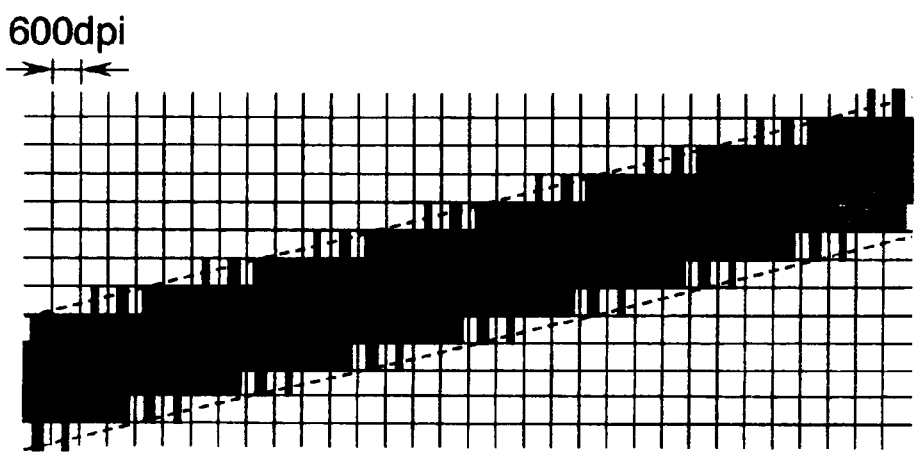
Figure 23A:
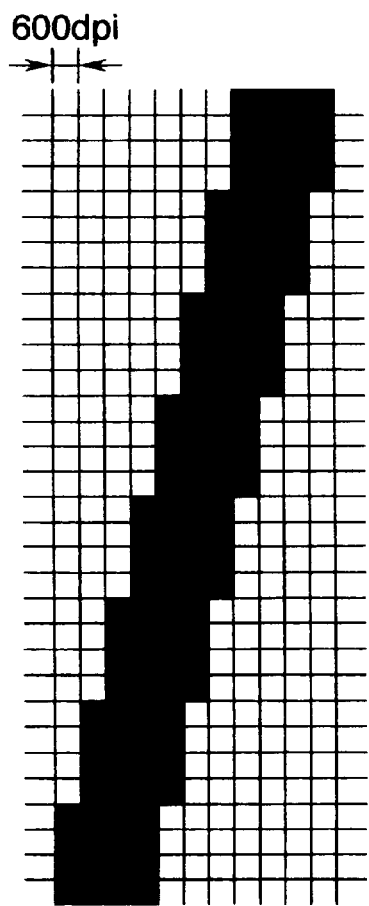
FIGS. 23A and 23B are schematic diagrams illustrating a print result of binary picture data of the second embodiment.
Figure 23B:
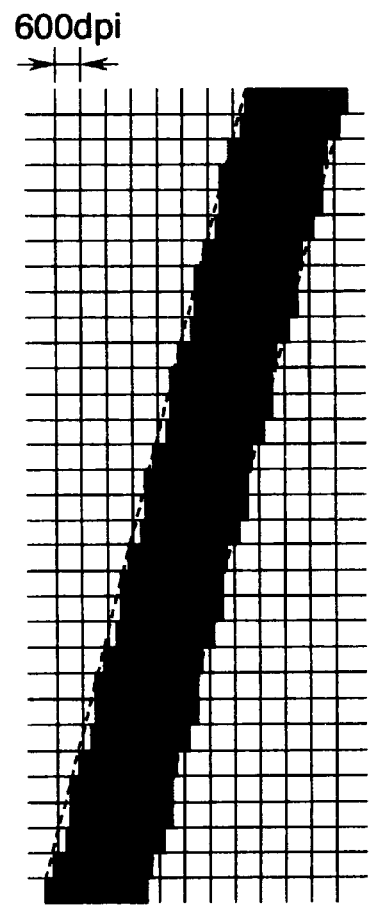

Examples of pictures printed in the above manner of the second embodiment are shown in schematic diagrams of FIGS. 22A and 22B for slanted lines near horizontal, and of FIGS. 23A and 23B for slanted lines near vertical. FIGS. 22A and 23A show original data of 600 dpi (without smoothing), and FIGS. 22B and 23B digitally show pictures printed by multivalue data converted by the smoothing logic circuit 14.

As described above, according to the second embodiment, the pixel growth start point during the smoothing process through pulse width modulation can be controlled, and the effective smoothing process can be performed particularly for slanted lines near vertical.

<Third Embodiment>

Next, the third embodiment of the invention will be described.

Figure 24:
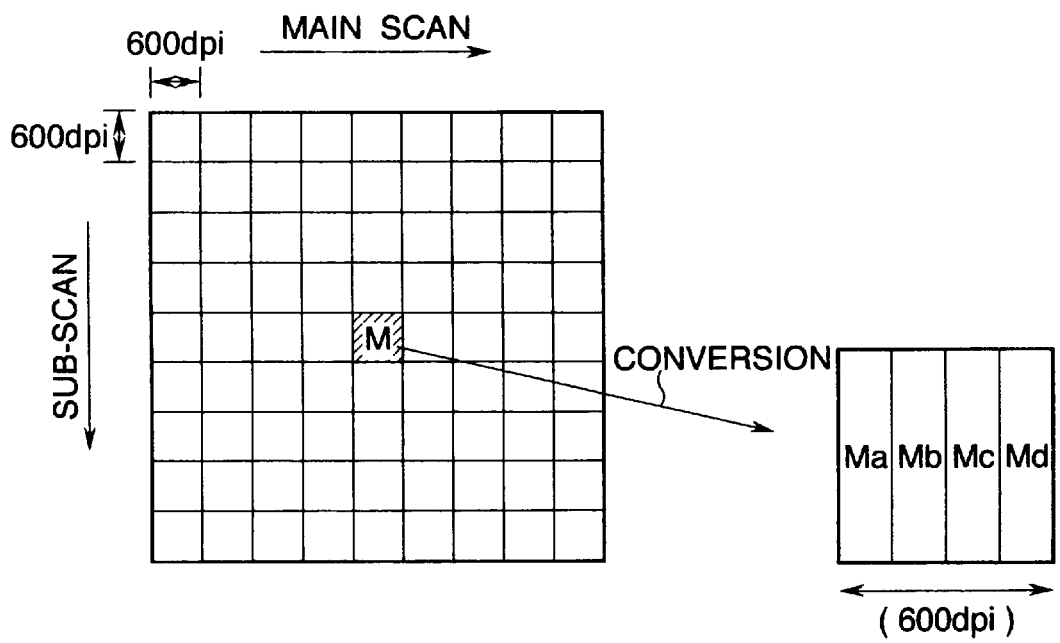
FIG. 24 is a diagram illustrating a picture data reference area and converted data according to a third embodiment of the invention.

The smoothing process for character/figure data of the third embodiment differs from the first and second embodiments. In the first and second embodiments, pixel data to be converted by the smoothing process is converted into multivalue data and printed through pulse width modulation at 600 lines per inch. In the third embodiment, however, as shown in FIG. 24, the target pixel M of 600 dpi is divided into four sections Ma, Mb, Mc, and Md in the main scan direction and converted into four multivalue data. The details of the conversion operation of the target pixel into multivalue data of the third embodiment will be given below. The structure of the third embodiment is the same as the first embodiment, and the description thereof is omitted.

The process for image data such as a photograph is the same as the first and second embodiments in which a print operation is performed through pulse width modulation at the center growth at 200 lines per inch.

Processing character/figure data will be described. Similar to the first and second embodiments, image signals of main scan 9 dots and sub-scan 9 lines including the center print pixel (target pixel) M are referred to for the pattern matching of a plurality of predetermined characteristic detecting bit map patterns in the smoothing logic circuit 14. If a pattern coincides with any one of the bit map patterns, data of the target pixel M, i.e., data of the four sections Ma, Mb, Mc, and Md corresponding to a main scan direction density of 2400 dpi, is converted into a corresponding multivalue data.

Figure 25A:
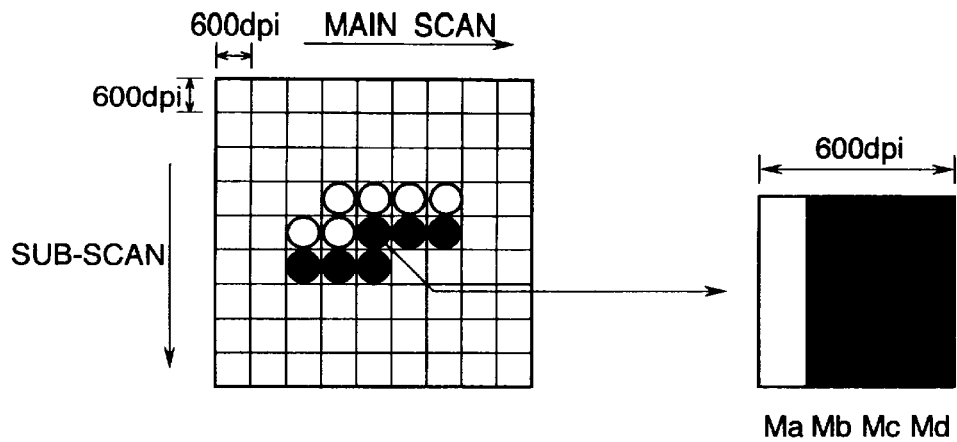
FIGS. 25A to 25C are diagrams showing examples of a bit map pattern for detecting the characteristics of binary picture data of the third embodiment.
Figure 25B:
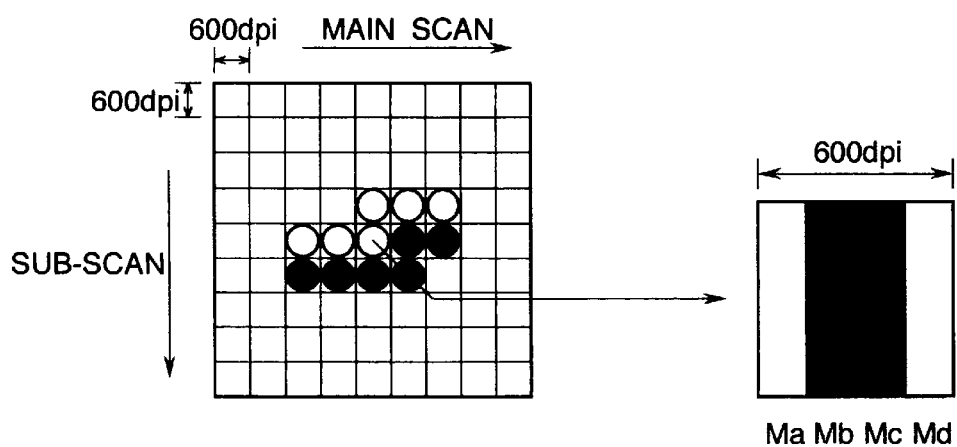
Figure 25C:
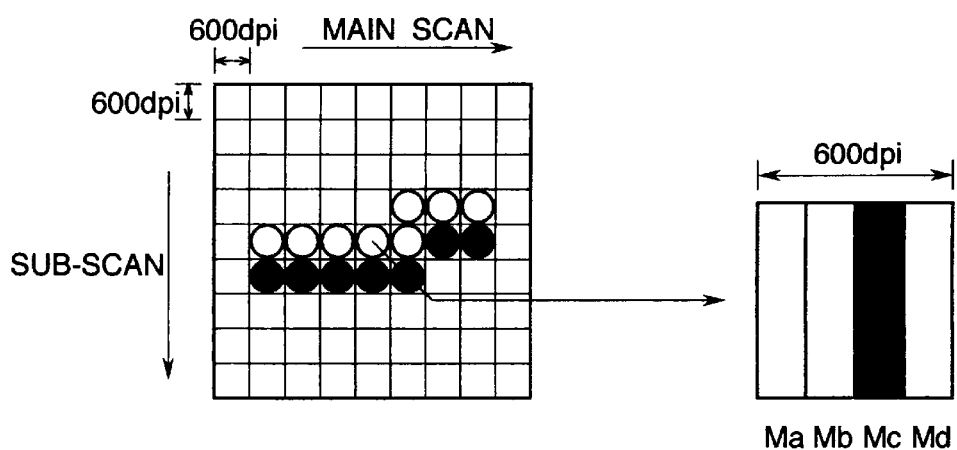
Figure 26A:
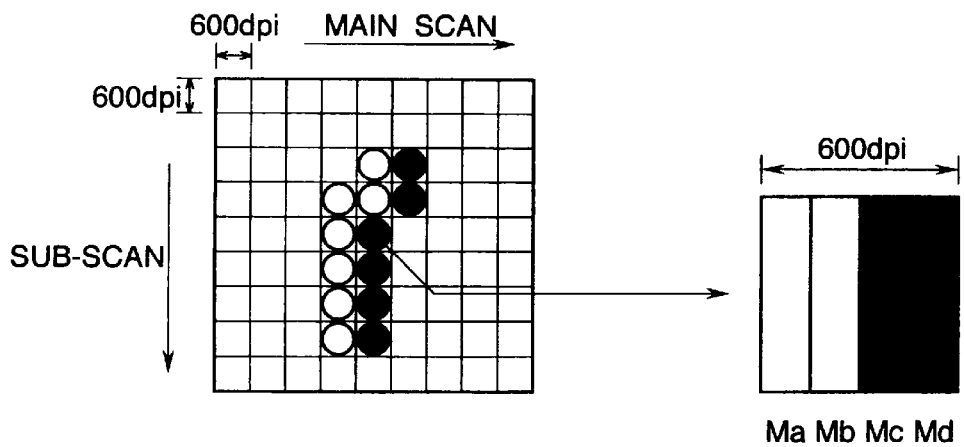
FIGS. 26A to 26C are diagrams showing examples of a bit map pattern for detecting the characteristics of binary picture data of the third embodiment.
Figure 26B:
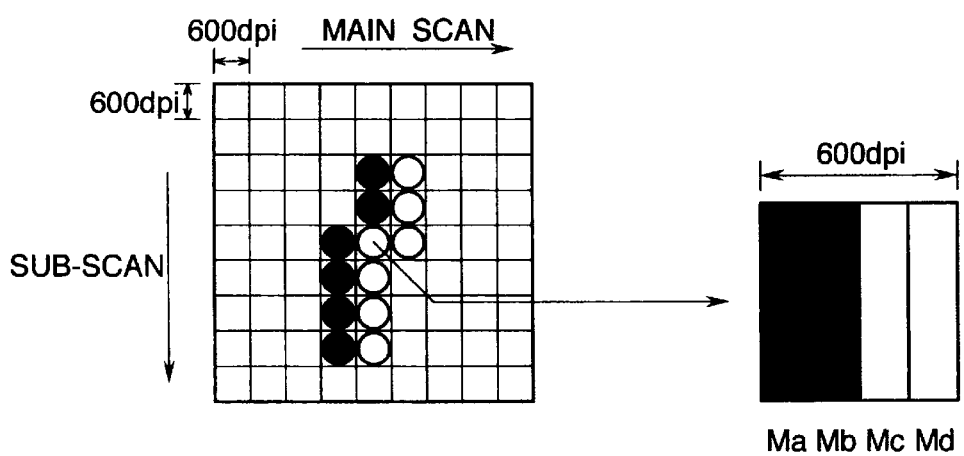
Figure 26C:
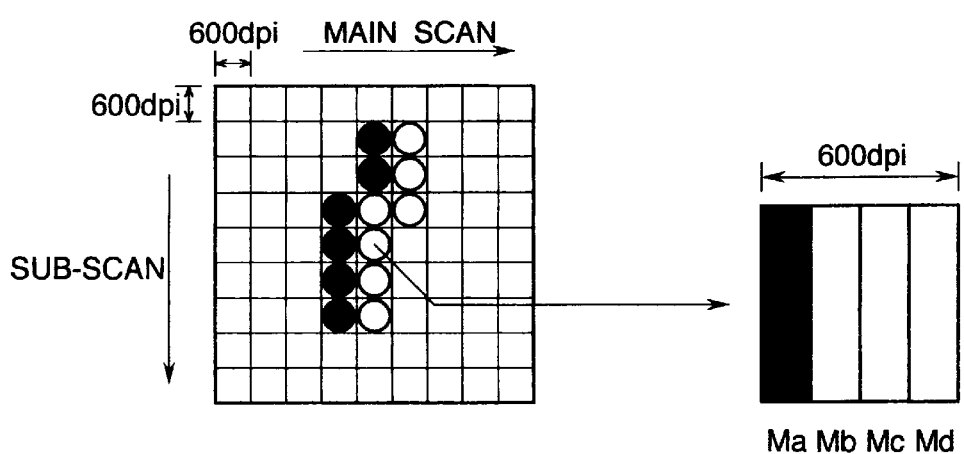

Examples of characteristic detecting bit map patterns of the third embodiment are shown in FIGS. 25A to 25C and in FIGS. 26A to 26C. The examples of characteristic detecting bit map patterns shown in FIGS. 25A to 25C and in FIGS. 26A to 26C correspond to those shown in FIGS. 15A to 15C and in FIGS. 16A to 16C of the first embodiment. For example, in FIG. 25A, the sections Mb, Mc, and Md of the target pixel are made black if a pattern coincides with the bit map pattern. Similarly, in FIG. 25B, the sections Mb and Mc are made black, and in FIG. 25C, the section Mc is made black. Also in FIGS. 26A to 26C, the sections Mc and Md are made black in FIG. 26A, the sections Ma and Mb are made black in FIG. 26B, and the section Ma is made black in FIG. 26C.

In the third embodiment, the smoothing logic circuit 14 outputs, as the data for the four divided sections Ma, Mb, Mc, and Md of the target pixel M, upper 4 bits including VDO7, VDO6, VDO5, and VDO4. In this case, the lower four bits VDO3 to VDO0 are not used. For example, in the example of FIG. 25A, VDO6, VDO5, and VDO4 respectively "true" are output. The VDO7 to VDO4 are output via the selector circuit 17 to the pulse width modulating circuit 18.

Figure 27:
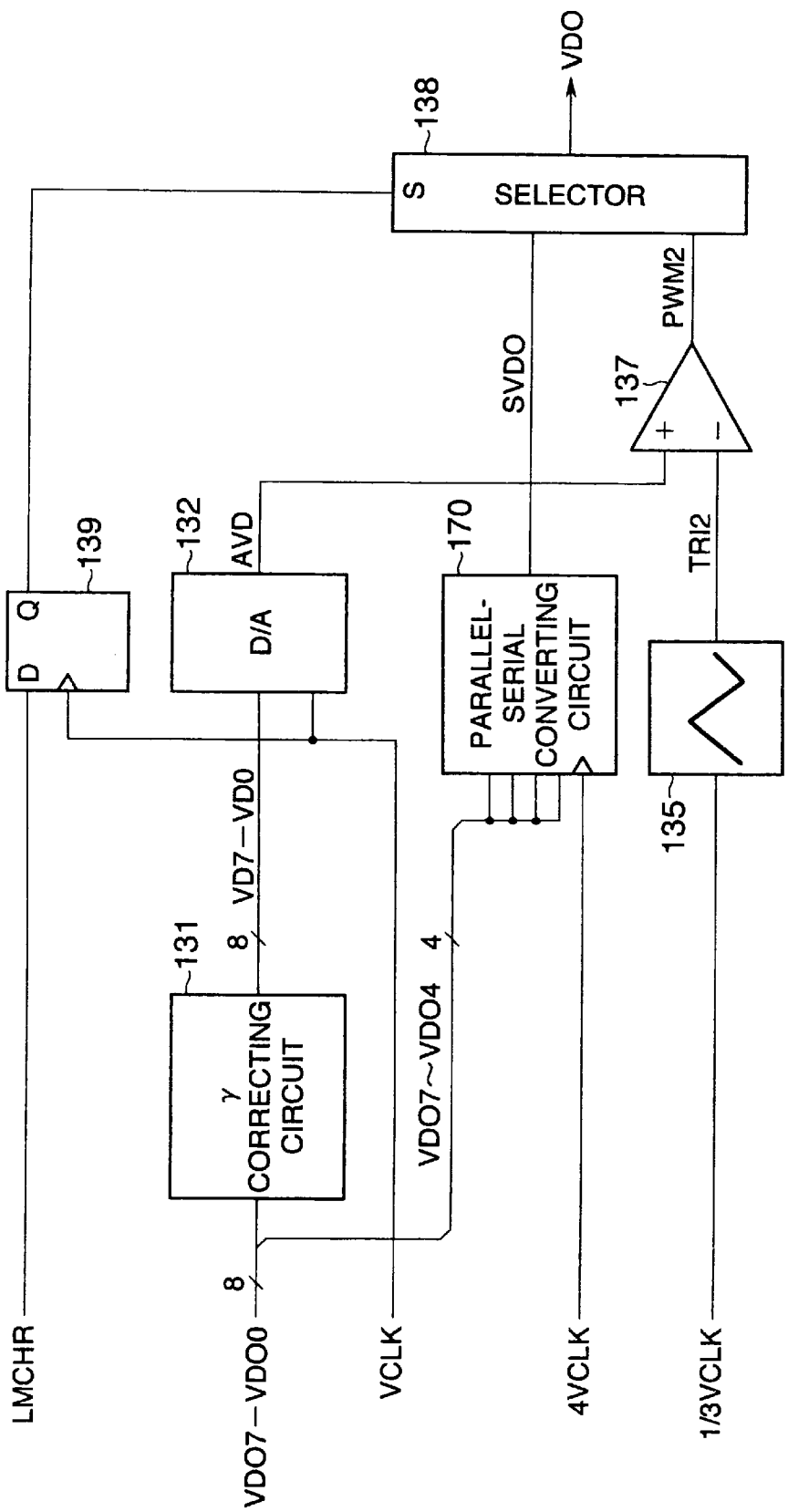
FIG. 27 is a block diagram showing the detailed structure of the pulse width modulating circuit 18 of the third embodiment.

The details of the structure of the pulse width modulating circuit 18 of the third embodiment are given in FIG. 27 in block. In FIG. 27, elements having the same function as the first embodiment shown in FIG. 11 are represented by using identical reference numerals, and the description thereof is omitted. In FIG. 27, reference numeral 170 represents a parallel-serial converting circuit for converting 4-bit parallel data into a serial signal having a fourfold frequency.

The video signal VDO7 to VDO4 is input to the parallel-serial converting circuit 170, converted into a serial signal in response to clocks 4VCLK having a fourfold frequency of the video signal transfer clocks VCLK, and output as the video signal SVDO corresponding to the main scan density of 2400 dpi. The selector 138 selects the SVDO signal for the character/figure area, and selects the pulse width modulated signal PWM2 for the image area at 200 lines per inch. The selected signal is supplied to the printer engine 100 to print it out.

As described above, according to the third embodiment, a finer process is possible because the pixel can be converted by the smoothing process at an optional position in the pixel, with a resolution corresponding to the main scan density of 2400 dpi.

<Fourth Embodiment>

Next, the fourth embodiment of the invention will be described.

In the fourth embodiment, bit map data developed at 600 dpi is compressed and stored in the picture memory, and when printing, it is expanded synchronously with the print speed of the printer engine 100. The structure of the fourth embodiment is the same as the first embodiment except the video controller 200, and the description of the same elements is omitted.

Figure 28:
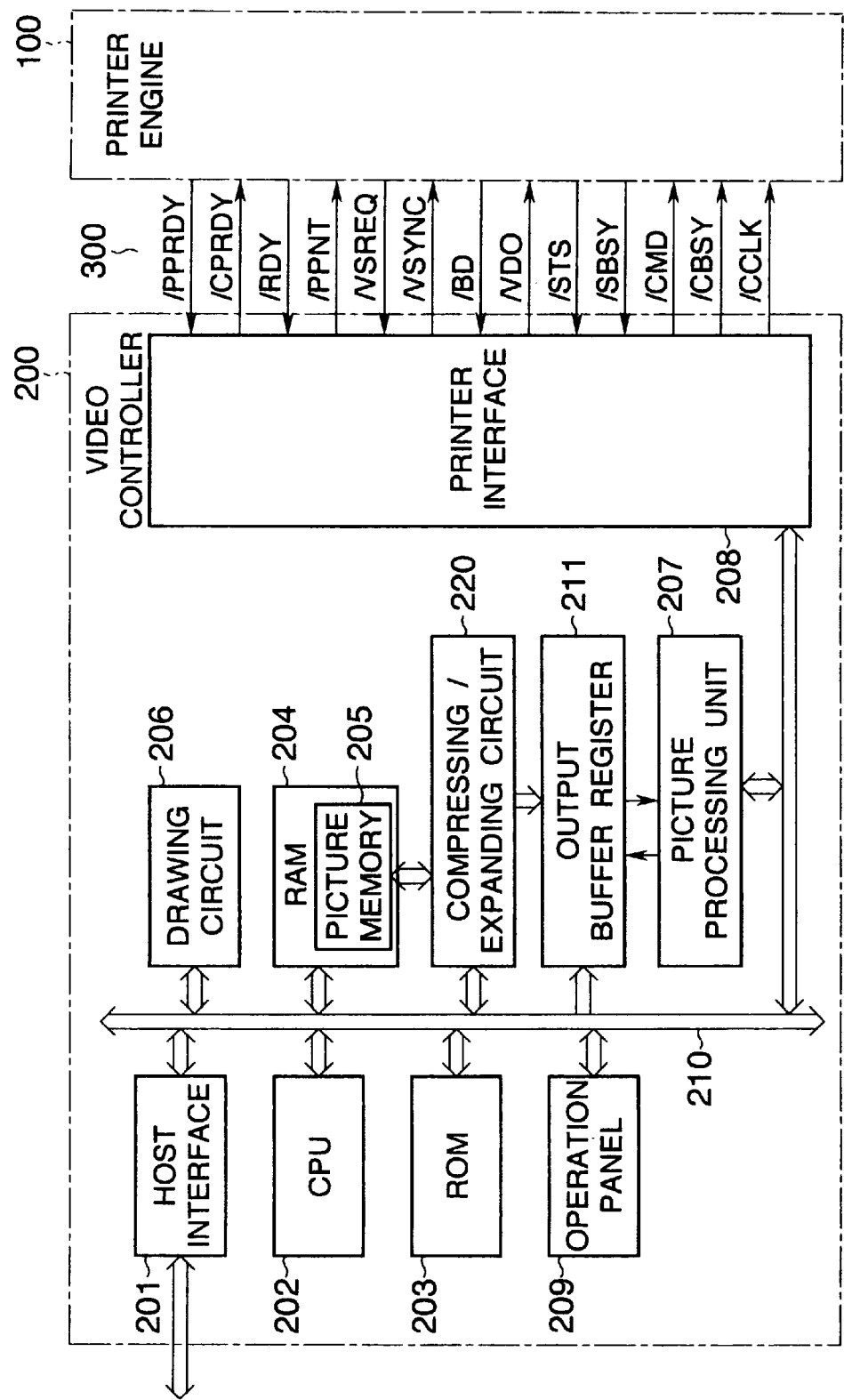
FIG. 28 is a block diagram showing the structure of a video controller 200 according to a fourth embodiment of the invention.

FIG. 28 is a schematic block diagram of the video controller 200 of the fourth embodiment. In FIG. 28, elements having the same structure as the first embodiment shown in FIG. 4 are represented by using identical reference numerals and the description thereof is omitted. In FIG. 28, reference numeral 220 represents a compressing/expanding circuit which has a function of compressing in real time input binary bit map picture information of 600 dpi and expanding the compressed data synchronously with the print speed of the printer engine 100 and outputting the expanded data. For example, a well-known JBIG scheme may be used as the compressing/expanding algorithm.

Similar to the first embodiment, the drawing circuit 206 generates bit map picture information of 600 dpi in accordance with the print information sent from the host computer 502. The bit map picture information is sequentially compressed by the compressing/expanding circuit 220 and thereafter stored in the picture memory 205. After compressed picture information of one page is stored in the picture memory 205, the compressing/expanding circuit 220 sequentially reads and expands the compressed picture information starting from the first main scan line. The expanded picture information is converted by the output buffer register 211 into the picture signal (video signal) CVDO synchronizing with the picture period of the printer engine 100, and input to the picture processing unit 207. The process and operation to follow are the same as the first embodiment, and the description thereof is omitted.

As described above, according to the fourth embodiment, the storage capacity of the picture memory can be reduced further so that a low cost image processing apparatus can be provided.

<Fifth Embodiment>

Next, the fifth embodiment of the invention will be described.

In all the first to fourth embodiments described above, the video controller 200 generates bit map data of 600 dpi, and the bit map data of one page is developed in the picture memory 205 for printing it.

In the fifth embodiment, even if the picture memory 205 has a storage capacity insufficient for storing of bit map data of one page at 600 dpi, the invention can be reduced in practice.

Figure 29:
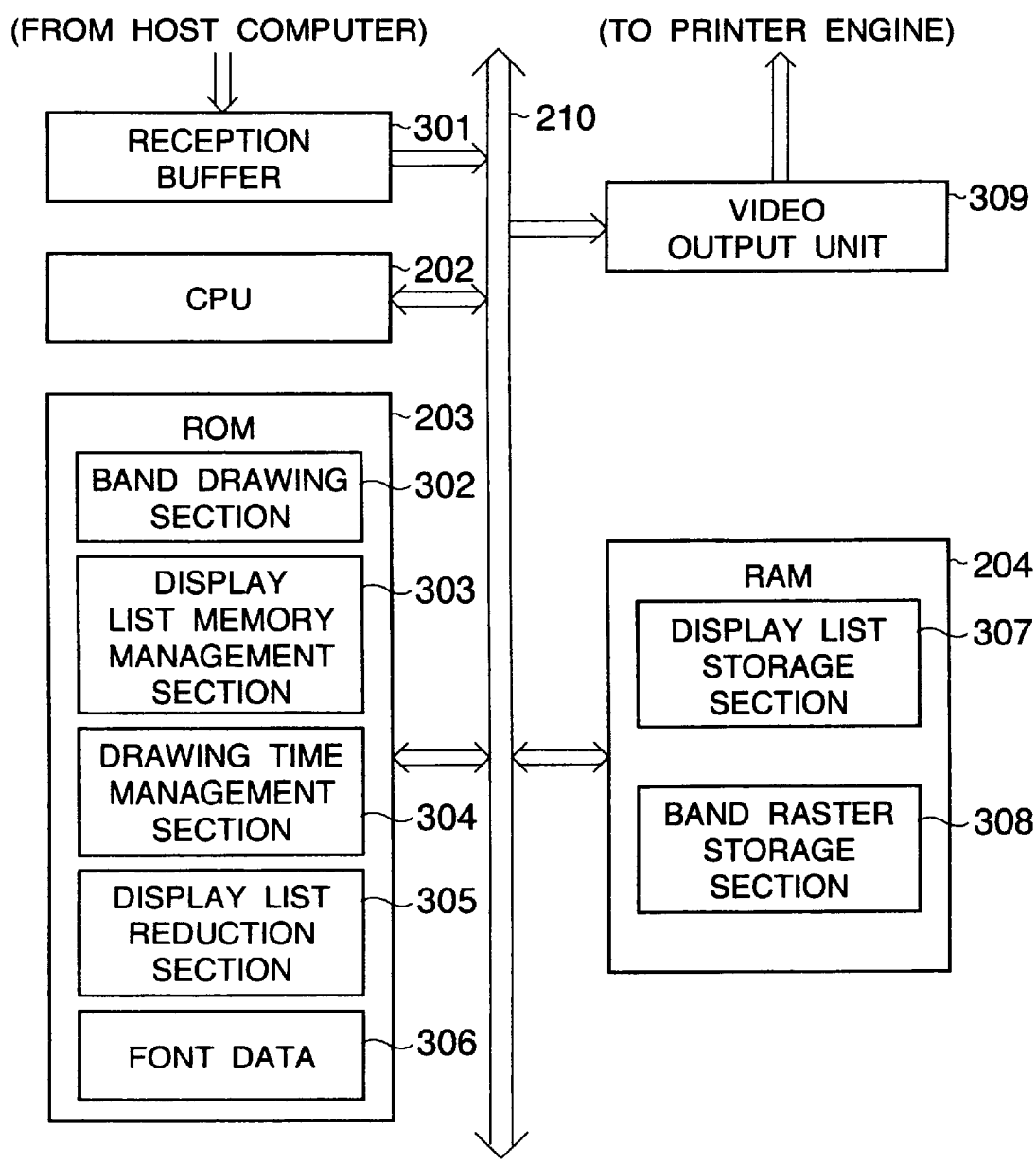
FIG. 29 is a block diagram showing the structure of a video controller 200 according to a fifth embodiment of the invention.

The structure of the fifth embodiment is fundamentally the same as the first embodiment. FIG. 29 shows the internal structure of the video controller 200 in block, particularly peripheral elements of CPU 202, ROM 203, and RAM 204.

Referring to FIG. 29, reference numeral 307 in RAM 204 represents a display list storage section which is a temporary memory area, temporarily stored in which is print data sent from the host computer 502 in a command format and converted by an intermediary file called a display list by CPU 202. In the fifth embodiment, during the image processing, the display list storage section 307 is properly reserved at a suitable size. The display list is constituted by a plurality of object data converted from vector data and character codes.

Reference numeral 308 in RAM 204 represents a band raster storage section which is reserved in advance having a size, for example, capable of storing bit map data of 256 main scan lines. In the fifth embodiment, for example, when the display list of one page is formed, CPU 202 uses an empty area of RAM 204 to sequentially develop (draw) the display list of the 256 main scan lines in the band raster unit and store the developed pictures in the band raster storage section 308.

Reference numeral 301 represents a reception buffer for storing data sent from the host computer 502, and reference numeral 309 represents a video output unit for outputting a picture to the printer engine 100. The video output unit 309 includes the output buffer register 211 and picture processing unit 207 of the first embodiment. In ROM 203, reference numeral 302 represents a band drawing section, reference numeral 303 represents a display list memory management section, reference numeral 304 represents a drawing time management section, reference numeral 305 represents a display list reduction section, and reference numeral 306 represents a font data storage section. Each section will be detailed later.

A video output sequence of the fifth embodiment will be detailed with reference to the flow chart of FIG. 30.

Figure 30:
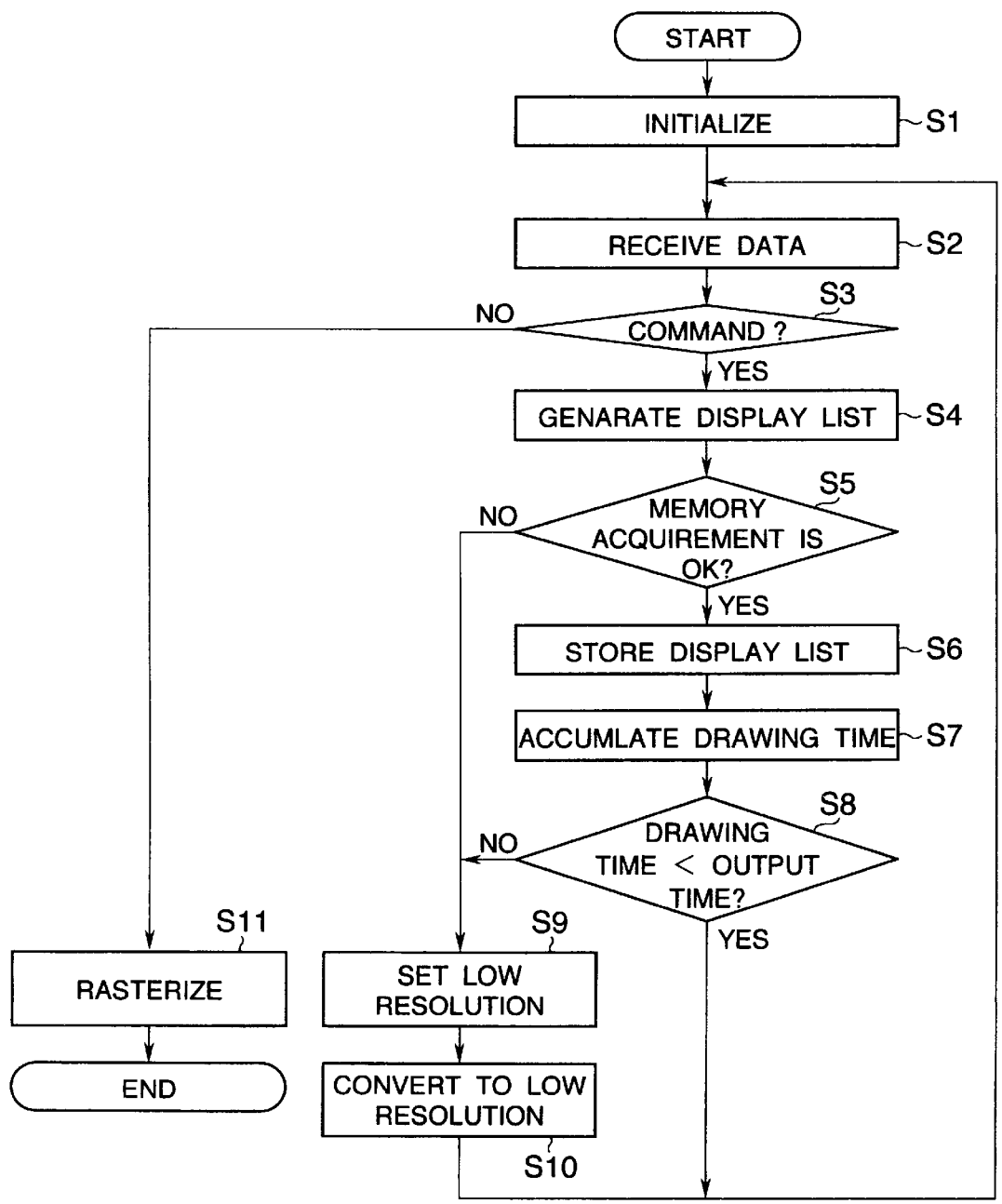
FIG. 30 is a flow chart illustrating the operation of a picture output process of the fifth embodiment.

Referring to FIG. 30, when power is supplied to the video controller 200, an initialization process is performed at Step S1. For example, the display list storage section 307 and band raster storage section 308 of RAM 204 are initialized, a resolution of the display list to be formed at Step S4 is set, and a band management table to be described later is initialized. In this embodiment, although the resolution is set to 600 dpi, it is obvious that other resolutions may be set.

At Step S2, data sent from the host computer 502 is received and stored in the reception buffer 301, and data of a predetermined unit code is read from the reception buffer 301. At Step S3 it is checked whether the received data is a command indicating print picture information, and if so, at Step S4 CPU 202 forms a display list of 600 dpi in the working area of RAM 204, in accordance with the command. At Step S5, in accordance with a program stored in the display list memory management section 303, CPU 202 reserves a memory area in RAM 204 as the display list storage section 307 for storing the display list formed at Step S4.

If the memory reservation at Step S5 is successful, the display list is stored in the reserved display list storage section 307 at Step S6. At Step S7, the drawing time management section 304 predicts a time required for the display list to be drawn in the band raster storage section 308. The predicted drawing time is added to a band management table in the drawing time management section 304 for accumulating drawing times, and thereafter, the flow advances to Step S8.

A time required, for the band raster data stored in the band raster storage section 308 and having a predetermined size (in this embodiment, 256 main scan lines), to be output to the video output unit 309, is predictable. This output prediction time is stored in ROM 203 in a predetermined area, for example, in the drawing time management section 304. At Step S8, the drawing predicted time in the band management table is compared with the predetermined output prediction time. If the drawing predicted time is shorter than the output prediction time, the flow returns to Step S2 to wait for the next data input in order to continue to generate the display list of the next data. If the drawing predicted time is longer than the output prediction time at Step S8, the flow advances to Step S9. If a sufficient memory size can not be reserved at Step S5, the flow also advances to Step S9.

At Step S9, all display lists cannot be stored at 600 dpi, and so the resolution of the display list is changed to 300 dpi. Data received thereafter is processed at 300 dpi.

At Step S10, the display list reduction section 305 converts the display lists of 600 dpi stored in each display list storage section 307 of RAM 204, into a low resolution at 300 dpi. In this case, each display list storage section 307 is again reserved having a size capable of storing the display list changed to 300 dpi. Thereafter, the flow returns to Step S2 to wait for the next data input.

In the fifth embodiment described above, if the time required for generating the next band raster data is longer than the time required for outputting the generated band raster, the resolution is lowered to shorten the band raster generation time and raise the total throughput. In the fifth embodiment, an area reserved in the display list storage section 307 of RAM 204 is assumed that it can store at least one page data at a resolution of 300 dpi. Therefore, even if a sufficient memory area cannot be reserved at 600 dpi, the memory area can surely be reserved at a lower resolution. The conversion to a low resolution at Step S10 is not obviously limited to 300 dpi if the sufficient area can be reserved.

If the resolution is limited to 300 dpi at Step S9, the drawing time accumulation process at Step S7 is not performed thereafter and at the same time the judgement at Step S8 is not performed. This is because one page data can be output reliably at a resolution of 300 dpi without considering the drawing time, although the total throughput is lowered.

If the data received at Step S3 is judged to be a paper ejection command, it means a completion of reception of one page picture data, and the flow advances to Step S11 whereat the display list in the display list storage section 307 is rasterized for each band and sequentially developed in the band raster storage section 308. In this case, if the display list stored in the display list storage section 307 is 600 dpi, the band raster is developed into a bit map of 600 dpi, whereas if the display list stored in the display list storage section 307 is 300 dpi, the band raster is developed into a bit map of 300 dpi.

After the completion of rasterization, band raster data in the band raster storage section 308 is converted and while being synchronized with the print speed of the printer engine 100 in the video output unit 309, for the data transfer to and print with the printer engine 100. For this sync operation, the band raster storage section 308 has an area corresponding to two bands. While data in one band area is transferred to the printer engine 100, the band raster data after rasterized is stored in the other band area.

Next, a flow of picture data will be described for the band raster developed at 600 dpi and 300 dpi.

If band raster data is developed at 600 dpi, picture data is generated in the same manner as the first embodiment. Of the print information supplied from the host computer 502, the binary picture print information is processed in the following manner, the binary picture print information including a character print command, a figure print command, a binary bit map data print command such as external fonts.

Specifically, bit map picture information of 600 dpi is generated and developed into band raster data, while executing a development process: for outline font data stored in the font data storage section 306 of ROM 203; for figure vector; and for binary bit map data into predetermined coordinates.

Of the print information, multivalue image picture information such as photograph data is converted into the density code pattern data and developed into band raster data by using the area of binary main scan 4 dots×sub-scan 4 dots at 600 dpi. The bit map data developed into the band raster data is subjected to the pattern matching, i.e., a smoothing process for binary picture and an inverse conversion into multivalue data for multivalue image picture, and a video signal is generated by pulse width modulation and sent to the engine 100.

Next, a flow of picture data for band raster data developed at 300 dpi will be described. Of the print information supplied from the host computer 502, the binary picture print information is processed in the following manner similar to 600 dpi. Specifically, bit map picture information of 300 dpi is generated and developed into band raster data, while executing a development process: for outline font data stored in the font data storage section 306 of ROM 203; for figure vector; and for binary bit map data into predetermined coordinates.

Of the print information, multivalue image picture information such as photograph data is converted into dither picture information at 300 dpi and developed into band raster data.

The bit map data developed into the band raster data is subjected to a smoothing process through pattern matching to be described later, and converted into picture data of 600 dpi, together with the binary picture and dither picture developed from the multivalue image picture. For the smoothing through pattern matching, an area of main scan 9 dots and sub-scan 9 lines around the center target pixel M at 300 dpi shown in FIG. 31 is referred to to convert the target pixel into four picture data of M1, M2, M3, and M4 at 600 dpi.

Figure 32A:
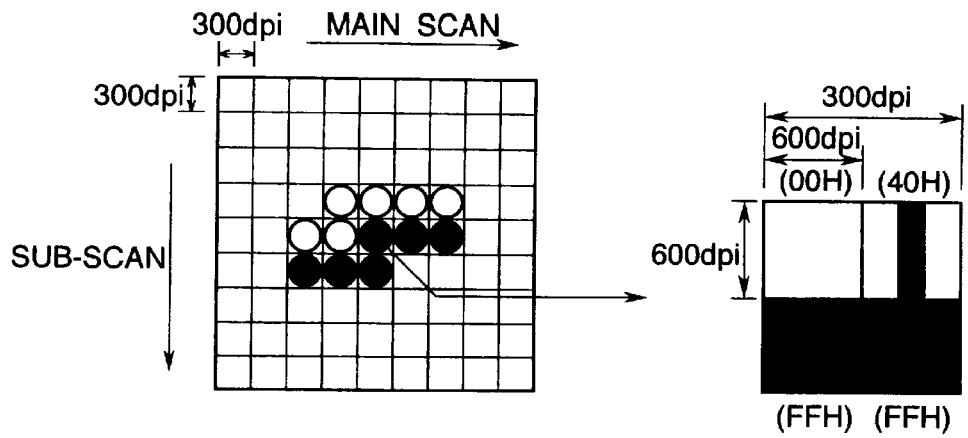
FIGS. 32A to 32C are diagrams showing examples of a bit map pattern for detecting the characteristics of binary picture data of the fifth embodiment.
Figure 32B:
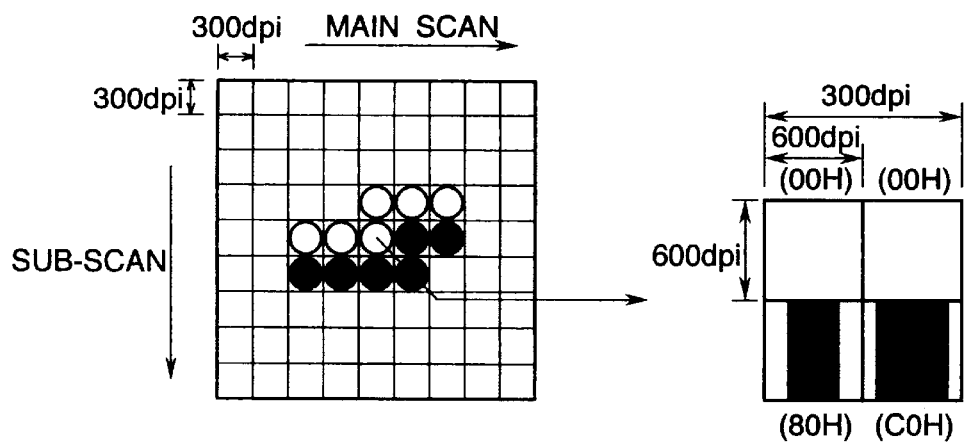
Figure 32C:
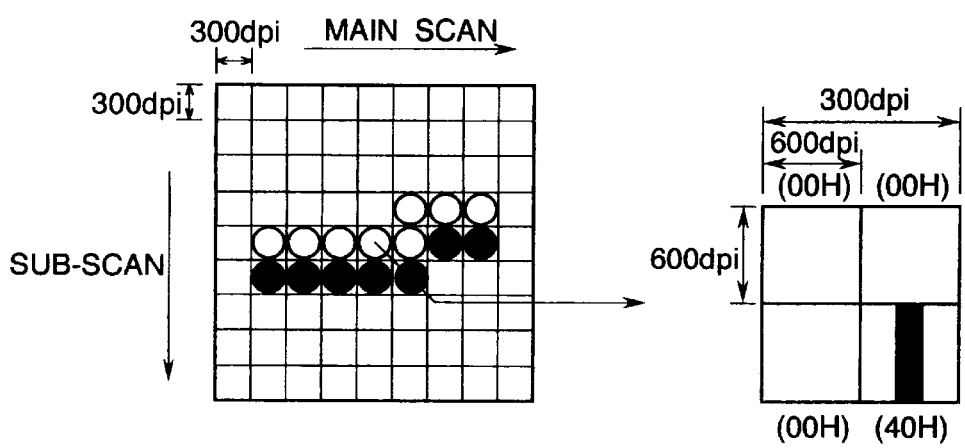

Examples of binary picture characteristic detecting bit map patterns of the fifth embodiment are shown in FIGS. 32A to 32C. The examples of characteristic detecting bit map patterns shown in FIGS. 32A to 32C correspond to those shown in FIGS. 15A to 15C of the first embodiment. For example, in FIG. 32A, if the pixel block of 300 dpi coincides with this bit map pattern, M1, M2, M3, and M4 at 600 dpi are set to "00H", "40H", "FFH", and "FFH", respectively, in the manner like the first embodiment.

Figure 33A:
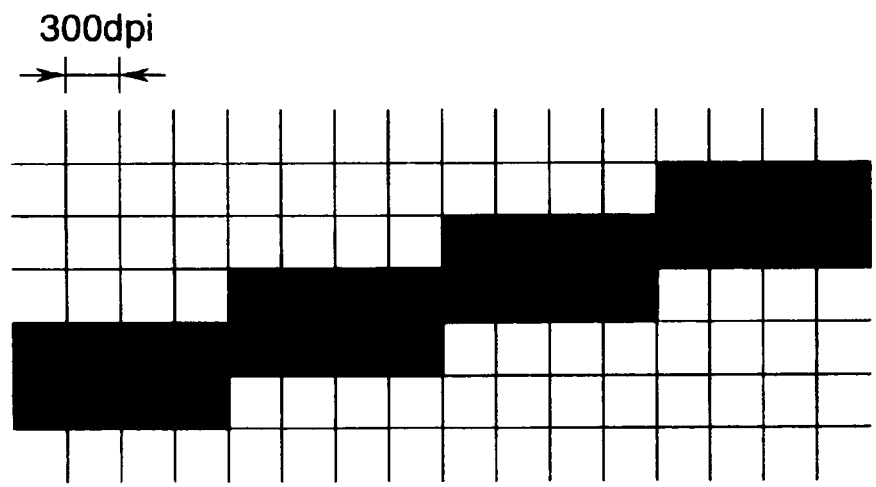
FIGS. 33A and 33B are schematic diagrams illustrating a print result of binary picture data of the fifth embodiment.
Figure 33B:
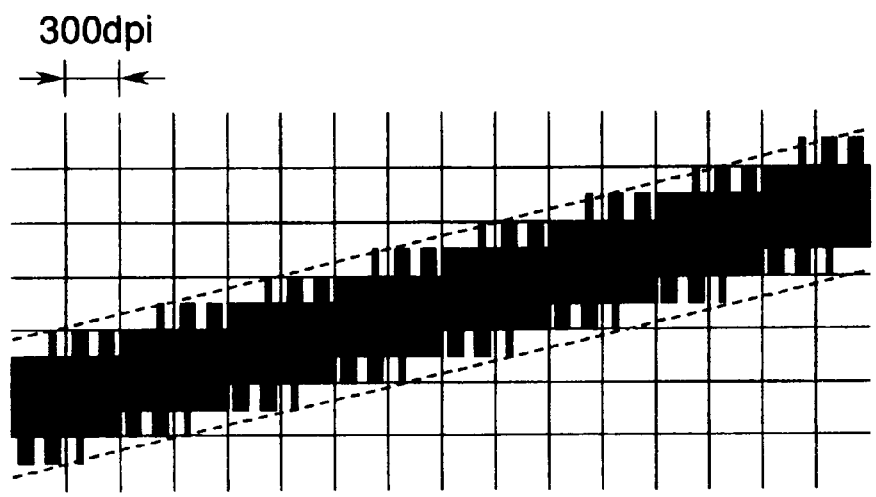

FIGS. 32A and 32B are schematic diagrams showing data before conversion and a print result of the data converted with reference to bit map data of the first embodiment. FIG. 33A shows data of 300 dpi before conversion, and FIG. 33B shows the print result of data converted at 600 dpi.

Figure 34:
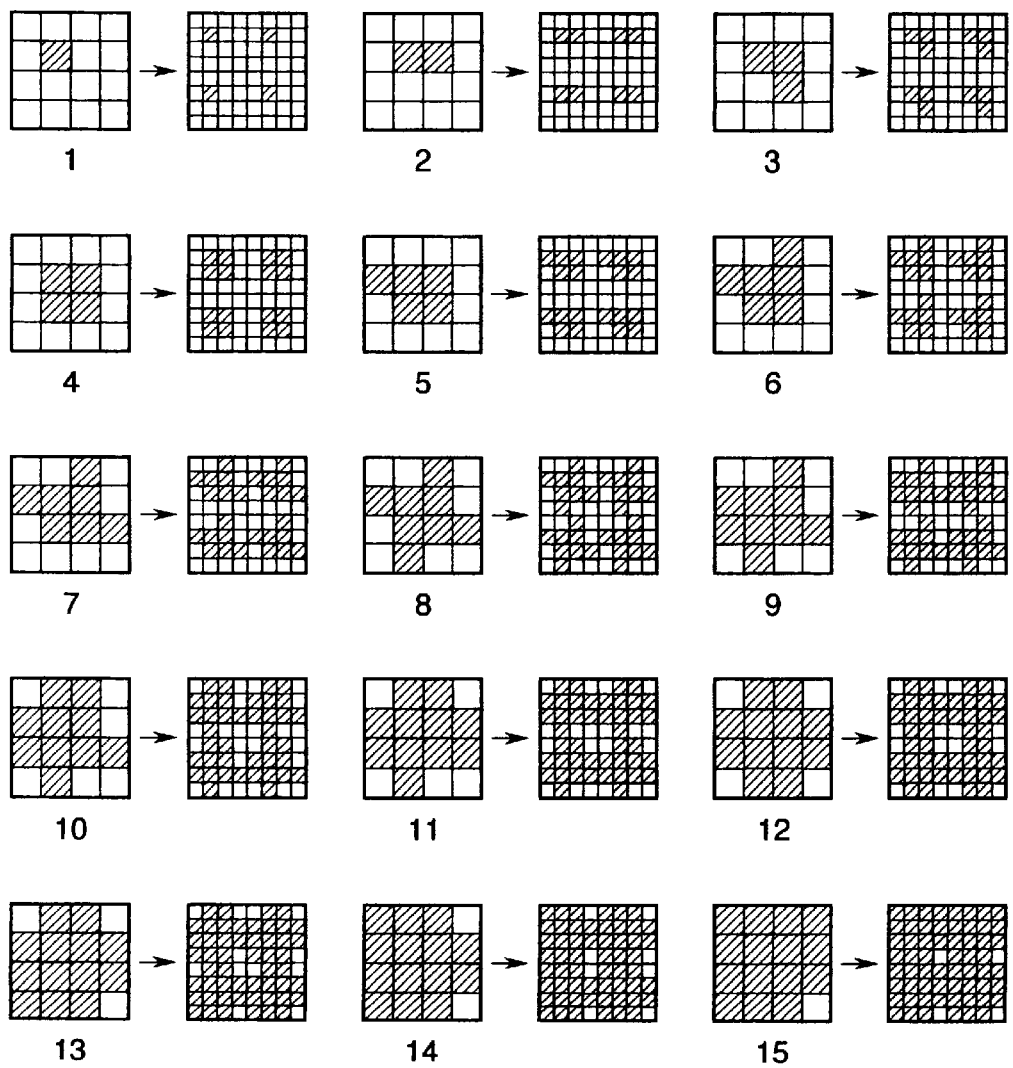
FIG. 34 is a diagram illustrating conversion of half-tone data of the fifth embodiment.

As shown in FIG. 34, in the dither pattern conversion of the fifth embodiment, the same pattern as each dither pattern (15 examples are shown in FIG. 34) constituted by 4×4 pixels of 300 dpi is allocated twice in both the main scan and sub-scan directions, totaling four times, in an area of 8×8 pixels of 600 dpi. In this manner, while the density of the original picture is retained, the original picture can be converted into a finer picture. Each numeral under each example shown in FIG. 34 indicates the number of black pixels contained in 16 pixels of 300 dpi.

Figure 35A:
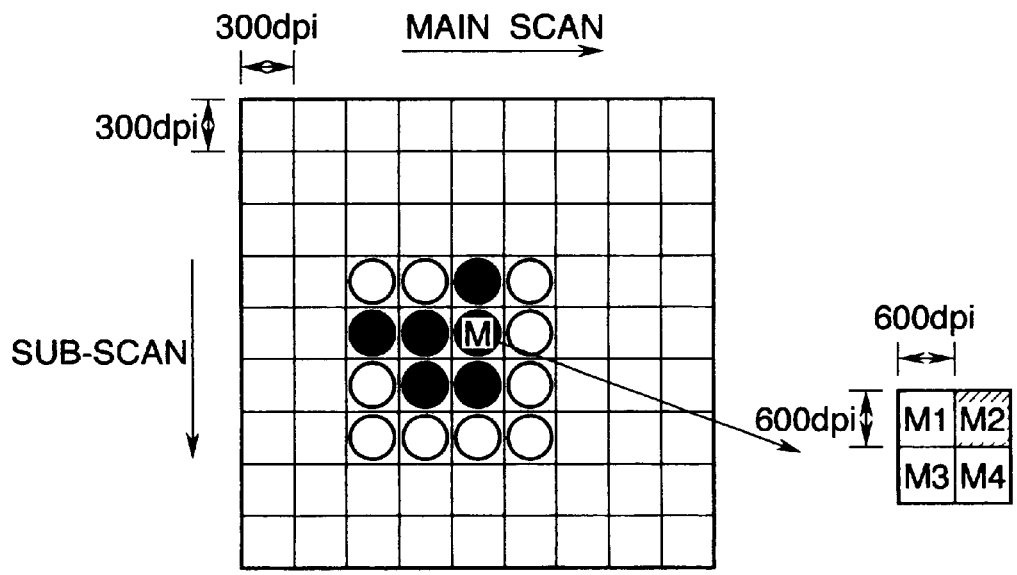
FIGS. 35A and 35B are diagrams showing examples of a bit map pattern for detecting the characteristics of half-tone data of the fifth embodiment.
Figure 35B:
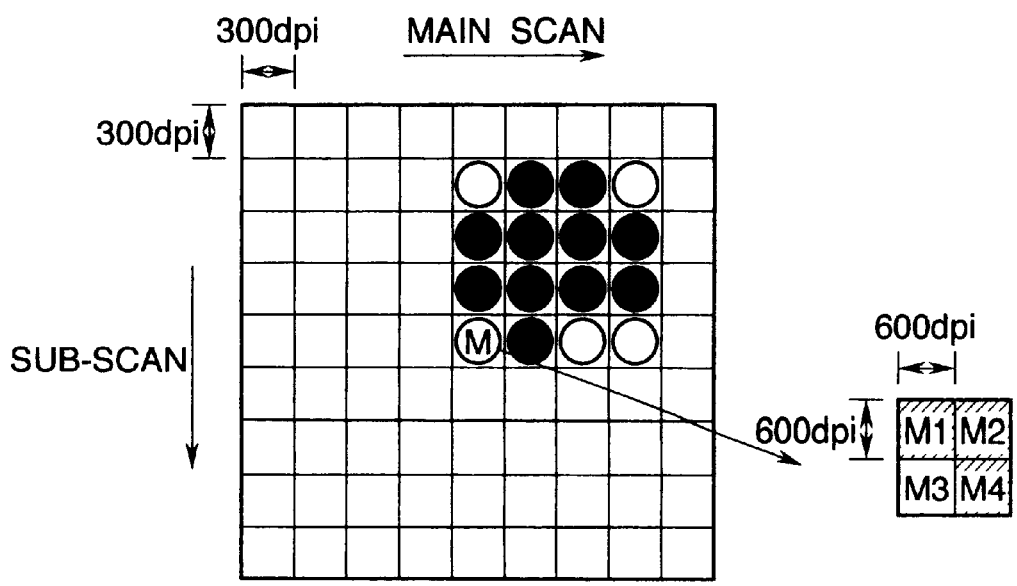

Examples of characteristic detecting bit map patterns of the fifth embodiment for realizing the smoothing process are shown in FIGS. 35A and 35B. In the example shown in FIG. 35A, of the target pixel M of 300 dpi, only M2 is converted into a black pixel at 600 dpi. Similarly, in the example shown in FIG. 35B, of the target pixel, M1, M2, and M4 are converted into black pixels.

The smoothing process for binary pictures and multivalue dither image pictures can be controlled independently.

As described above, according to the fifth embodiment, even if the picture memory has a capacity smaller than one page bit map data of 600 dpi, the picture data can be processed in the band raster unit to realize the present invention, and an output picture of high quality can be formed.

In each embodiment described above, although a plurality of characteristic detecting bit maps are stored in the smoothing logic circuit 14, they may be stored in ROM 203 or RAM 204. This is also true for the density code patterns.

Also in each embodiment described above, although particular resolutions are used, the invention is not limited thereto, but any other resolutions may be set as desired.

The invention is applicable to a system constituted by a plurality of apparatuses or to a single apparatus. The invention is also applicable to a system or an apparatus provided with programs achieving the operations of the invention.

As appreciated from the foregoing description of the invention, multivalue image data is stored in a binary bit map format. Accordingly, an image output apparatus and method can be provided which is capable of printing not only multivalue image pictures such as photographs but also binary pictures such as characters, with high quality by using a small capacity picture memory.

According to the present invention, a multivalue picture area and a binary picture area are formed on a bit map area without discriminating therebetween. Accordingly, an image processing apparatus and method can be realized easily which is capable of printing both binary pictures and multivalue image pictures with high quality without changing conventional architectures to a large extent.

What is claimed is:

1. An image processing apparatus comprising:
   means for obtaining binary image information;
   converting means for converting multivalue image information into code information;
   synthesizing means for sequentially writing the binary image information obtained by said obtaining means or the code information converted by said converting means in a memory so as to obtain synthesized information; and
   discriminating means for discriminating the code information from the synthesized information obtained by said synthesizing means.

2. An image processing apparatus according to claim 1, wherein a data size of the code information converted by said converting means from one pixel of the multivalue image information corresponds to that of plural pixels of the binary image information.

3. An image processing apparatus according to claim 2, wherein said converting means converts the multivalue image information into the code information corresponding to a predetermined dot pattern having 4×4 pixels.

4. An image processing apparatus according to claim 1, further comprising image forming means for forming an image in accordance with the synthesized information obtained by said synthesizing means.

5. An image processing apparatus according to claim 4, wherein said image forming means includes light emitting means for emitting light modulated in accordance with the synthesized information.

6. An image processing apparatus according to claim 4, wherein said image forming means is a laser beam printer for forming an image through pulse width modulation.

7. An image processing apparatus according to claim 5, further comprising:
   pulse width modulating means for generating a pulse width modulating signal in accordance with the synthesized information; and
   laser driving means for driving a semiconductor laser with the pulse width modulating signal from said pulse width modulating means.

8. An image processing apparatus according to claim 7, wherein said pulse width modulating means changes a unit of pulse width modulation in accordance with the selection by said selecting means.

9. An image processing apparatus according to claim 1, further comprising second converting means for converting the code information discriminated by said discriminating means into the multivalue image information.

10. An image processing apparatus according to claim 9, further comprising quasi half-tone generating means for generating a quasi half-tone pattern from the multivalue image information converted by said second converting means.

11. An image processing apparatus according to claim 9, further comprising smoothing means for executing an edge smoothing process for at least the binary image information in the synthesized information.

12. An image processing apparatus according to claim 10, wherein the quasi half-tone pattern is a dither pattern.

13. An image processing apparatus according to claim 11, further comprising selecting means for selecting either the smoothing processed information or the converted multivalue image information.

14. An image processing apparatus according to claim 1, wherein a number of bits, of a plurality of bits forming the code information, having a predetermined logic value corresponds to a density value of the multivalue image information.

15. An image processing apparatus according to claim 1, wherein said discriminating means includes detecting means for detecting a predetermined dot pattern from the synthesized information.

16. An image processing apparatus according to claim 1, further comprising:
   compressing means for compressing the synthesized information synthesized by said synthesizing means; and
   expanding means for expanding the compressed binary picture information.

17. An image processing apparatus according to claim 1, further comprising:
   input means for inputting information from an external device; and
   second discriminating means for discriminating whether the input information is information specifying a binary picture or information specifying a multivalue picture, wherein said obtaining means comprises means for generating binary image information on the basis of the information specifying the binary picture, and wherein said binary information generating means generates a first or second resolution of the binary image information.

18. An image processing apparatus according to claim 17, further comprising:
   means for converting the information input by said input means to intermediate data,
   wherein said binary image information generating means generates the first or second resolution of the binary image information in accordance with at least one of a capacity for storing the intermediate data and an amount of the information input from said input means.

19. An image processing apparatus according to claim 17, wherein said obtaining means comprises means for converting binary image information with the first resolution into binary image information with the second resolution when said binary image information generating means generates the binary image information with the first resolution.

20. An image processing method comprising the steps of:
   obtaining binary image information;
   converting multivalue image information into code information;
   sequentially writing the binary image information obtained in said obtaining step or the code information converted in said converting step in a memory so as to obtain synthesized information; and
   discriminating the code information from the synthesized information obtained in said synthesizing step.

21. An image processing method according to claim 20, further comprising the steps of:
   compressing the synthesized information synthesized in said synthesizing step; and
   expanding the compressed information.

22. An image processing method according to claim 20, further comprising the steps of:
   inputting information from an external device;
   discriminating whether the input information is information specifying a binary picture or information specifying a multivalue picture, wherein said obtaining step includes generating binary image information, having a first or second resolution, on the basis of the information specifying the binary picture.

23. An image processing method according to claim 22, further comprising the step of:
converting the information input in said inputting step to intermediate data,
wherein the first or second resolution of the binary image information is generated in accordance with at least one of a capacity for storing the intermediate data and an amount of the information input in said input step.

24. An image processing method according to claim 22, wherein said obtaining step includes converting binary image information with the first resolution into binary image information with the second resolution when binary image information with the first resolution is generated in said generating step.

25. An image processing method according to claim 20, wherein a data size of the code information converted in said converting step from one pixel of the multivalue image information corresponds to that of plural pixels of the binary image information.

26. An image processing method according to claim 20, further comprising the step of forming an image in accordance with synthesized information obtained in said synthesizing step.

27. An image processing method according to claim 20, further comprising a second converting step of converting the code information discriminated in said discriminated step into the multivalue image information.

28. An image processing method according to claim 27, further comprising the step of smoothing at least the binary image information in the synthesized information by executing an edge smoothing process.

29. An image processing method according to claim 28, further comprising the step of selecting either the smoothed information or the converted multivalue image information.

30. An image processing method according to claim 20, wherein said discriminating step includes detecting a predetermined dot pattern from the synthesized information.

31. An image processing method according to claim 20, further comprising the step of generating a quasi half-tone pattern from the multivalue image information converted in said second converting step.

32. An image processing method according to claim 31, wherein the quasi half-tone pattern is a dither pattern.

\* \* \* \* \*

UNITED STATES PATENT AND TRADEMARK OFFICE
CERTIFICATE OF CORRECTION

PATENT NO.   : 5,982,508
DATED        : November 9, 1999
INVENTOR(S)  : Atsushi Kashihara It is certified that error appears in the above-identified patent and that said Letters Patent is hereby corrected as shown below:

Sheet 5,
FIG. 5, "CHARACTOR/" should read -- CHARACTER --.

Column 1,
Line 19, "technique" should read -- techniques --;
Line 41 "at" should read -- at a --; and
Line 50, "a data" should read -- data --.

Column 2,
Line 12, "a load" should read -- the load --; and
Line 13, "increases" should read -- increases, --.

Column 6,
Line 24, "recording" should read -- a recording --;
Line 38, "of" should read -- of a --;
Line 49, "move" should read -- moved --.

Column 8,
Line 25, "211," should read -- 211 --; and
Line 65, "used" should read -- is used --.

Column 9,
Line 4, "used" should read -- is used --;
Line 12, "used" should read -- is used --;
Line 33, "of" should be deleted.

Column 10,
Line 45, "of " should read -- is --.

Column 11,
Line 58, "FIG. 8," should read --FIG. 7, -- and "1 to 7" should read --1 to 8 --.

Column 13,
Line 33, "as" should read -- as a -- and "a process" should read -- processing --; and
Line 56, "16 pixel" should read -- 16 pixel --.

Column 14,
Line 17, "halt-tone" should read -- half-tone --.

UNITED STATES PATENT AND TRADEMARK OFFICE
CERTIFICATE OF CORRECTION

PATENT NO. : 5,982,508
DATED : November 9, 1999
INVENTOR(S) : Atsushi Kashihara

It is certified that error appears in the above-identified patent and that said Letters Patent is hereby corrected as shown below:

Column 16,
Line 7, "picture," should read -- picture --.

Column 17,
Line 29, "Pictures" should read -- Pictures, -- and "18B" should read -- 18B, --.

Column 22,
Line 30, "required," should read -- required --.

Column 23,
Line 19, "and while" should read -- while --; and
Line 25, "rasterized" should read -- being rasterized --.

Column 28,
Line 3, "discriminated" (second occurrence) should read -- discriminating --.

Signed and Sealed this

Twenty-first Day of August, 2001

*Attest:*

*Nicholas P. Godici*

*Attesting Officer*

NICHOLAS P. GODICI
*Acting Director of the United States Patent and Trademark Office*